United States Patent
Kuwayama et al.

(10) Patent No.: US 10,207,541 B2
(45) Date of Patent: *Feb. 19, 2019

(54) PNEUMATIC RADIAL TIRE FOR A PASSENGER VEHICLE AND METHOD OF USING THE SAME

(75) Inventors: Isao Kuwayama, Kodaira (JP); Hiroyuki Matsumoto, Kodaira (JP); Shintaro Hatanaka, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 178 days.

This patent is subject to a terminal disclaimer.

(21) Appl. No.: 14/240,658

(22) PCT Filed: Aug. 24, 2012

(86) PCT No.: PCT/JP2012/005343
§ 371 (c)(1),
(2), (4) Date: Feb. 24, 2014

(87) PCT Pub. No.: WO2013/031167
PCT Pub. Date: Mar. 7, 2013

(65) Prior Publication Data
US 2014/0209228 A1    Jul. 31, 2014

(30) Foreign Application Priority Data

Aug. 26, 2011 (JP) ................. 2011-185178
Aug. 26, 2011 (JP) ................. 2011-185195
Aug. 26, 2011 (JP) ................. 2011-185279

(51) Int. Cl.
*B60C 3/04* (2006.01)
*B60C 15/06* (2006.01)
(Continued)

(52) U.S. Cl.
CPC .................. *B60C 3/04* (2013.01); *B60C 9/08* (2013.01); *B60C 13/00* (2013.01); *B60C 15/04* (2013.01);
(Continued)

(58) Field of Classification Search
CPC ........... B60C 3/04; B60C 15/04; B60C 15/06; B60C 15/0603; B60C 2015/061
See application file for complete search history.

(56) References Cited

U.S. PATENT DOCUMENTS 2,676,636 A * 4/1954 Sarbach ................ B60C 1/0008
152/510
3,786,851 A 1/1974 Mirtain et al.
(Continued)

FOREIGN PATENT DOCUMENTS

BG       61716 B1    4/1998
CN    1642758 A     7/2005
(Continued)

OTHER PUBLICATIONS

600R16 Coker Classic Blackwall Tire as accessed on the Internet Archive at http://web.archive.org/web/20081004230735/http://store.coker.com/600r16-coker-classic-blackwall-tire.html showing the page as of Oct. 4, 2008.*

(Continued)

*Primary Examiner* — Justin R Fischer
*Assistant Examiner* — Philip N Schwartz
(74) *Attorney, Agent, or Firm* — Sughrue Mion, PLLC

(57) ABSTRACT

A pneumatic radial tire for a passenger vehicle according to the present invention has an appropriate relationship between a tire cross-sectional width SW and a tire outer diameter OD. Also, a method of using the pneumatic radial tire for a passenger vehicle according to the present invention is to use the above radial tire with at least specified internal pressure.

15 Claims, 26 Drawing Sheets

(51) Int. Cl.
*B60C 9/08* (2006.01)
*B60C 13/00* (2006.01)
*B60C 15/04* (2006.01)
*B60C 9/04* (2006.01)

(52) U.S. Cl.
CPC .. *B60C 15/0603* (2013.01); *B60C 2009/0425* (2013.01); *B60C 2013/007* (2013.01); *B60C 2015/061* (2013.01)

(56) References Cited

U.S. PATENT DOCUMENTS

| | | | |
|---|---|---|---|
| 4,181,188 A | | 1/1980 | Dessert |
| 4,349,061 A | | 9/1982 | Hirakawa et al. |
| 4,385,653 A | * | 5/1983 | Okazaki ................. B60C 11/00 152/209.5 |
| 4,462,447 A | | 7/1984 | Siefert et al. |
| 5,186,772 A | | 2/1993 | Nakasaki et al. |
| 5,480,700 A | | 1/1996 | Kume et al. |
| 5,882,450 A | | 3/1999 | Benchea |
| 6,481,479 B1 | | 11/2002 | Weed et al. |
| 2002/0157750 A1 | * | 10/2002 | Riva ..................... B60O 9/0007 152/427 |

FOREIGN PATENT DOCUMENTS

| | | |
|---|---|---|
| CN | 101842248 A | 9/2010 |
| EP | 0 119 152 A2 | 9/1984 |
| EP | 0370699 A2 | 5/1990 |
| EP | 0 890 452 A2 | 1/1999 |
| EP | 1491364 A1 | 12/2004 |
| FR | 2719525 A1 | 11/1995 |
| JP | 53040903 A | 4/1978 |
| JP | 55-031697 A | 3/1980 |
| JP | 3-213404 A | 9/1991 |
| JP | 04-108003 A | 4/1992 |
| JP | 5-138736 A | 6/1993 |
| JP | 7-5810 A | 1/1995 |
| JP | 07-040706 A | 2/1995 |
| JP | 7-156609 A | 6/1995 |
| JP | 08-164709 A | 6/1996 |
| JP | 08164718 A | 6/1996 |
| JP | 10-58910 A | 3/1998 |
| JP | 10-217722 A | 8/1998 |
| JP | 11-348514 A | 12/1999 |
| JP | 2000-190706 A | 7/2000 |
| JP | 2000225817 A | 8/2000 |
| JP | 2000-301916 A | 10/2000 |
| JP | 2003-267005 A | 9/2003 |
| JP | 2005-001443 A | 1/2005 |
| JP | 2006-160106 A | 6/2006 |
| JP | 2006-168546 A | 6/2006 |
| JP | 2008-168800 A | 7/2008 |
| JP | 2009-057022 A | 3/2009 |
| JP | 2009-001228 A | 8/2009 |
| JP | 2010-47191 A | 3/2010 |
| JP | 2010100252 A * | 5/2010 ............. B60C 17/00 |

OTHER PUBLICATIONS

Coker Classic Radial 600R16—Blackwall Tire as accessed at http://www.tiresandwires.com/Coker-Classic-Radial-600R16--Blackwall-Tire_p_69.html on Jan. 11, 2015.*
Machine translation of JP2008-168800 (no date).*
Machine translation of JP10-217722 (no date).*
Machine translation of JP2000-190706 (no date).*
Machine translation of JP03-213404 (no date).*
05-07 Cadillac STS Factory Goodyear T145/70R17 Spare Wheel Tire OEM V8 as accessed from http://www.ebay.com/itm/05-07-CADILLAC-STS-FACTORY-GOODYEAR-T145-70R17-SPARE-WHEEL-TIRE-OEM-V8-/172734714482 on Aug. 14, 2017.*
International Search Report for PCT/JP2012/005343, dated Oct. 30, 2012.
Extended European Search Report dated Apr. 28, 2015, issued by the European Patent Office in counterpart European application No. 12828739.8.
Communication dated Nov. 23, 2015 from the Intellectual Property Office of P.R. China issued in corresponding Application No. 201280051681.3.
Non Final Office Action dated Jun. 7, 2017 issue in U.S. Appl. No. 14/355,738.
Communication dated Apr. 10, 2018 from the United States Patent and Trademark Office in counterpart U.S. Appl. No. 15/139,837.
Response to Office Action dated Jul. 10, 2018, which issued during the prosecution of U.S. Appl. No. 15/139,837.
Response to Office Action dated Jul. 10, 2018, which issued during the prosecution of U.S. Appl. No. 15/139,894.
Communication dated Apr. 11, 2018 from the United States Patent and Trademark Office in counterpart U.S. Appl. No. 15/139,894.

* cited by examiner

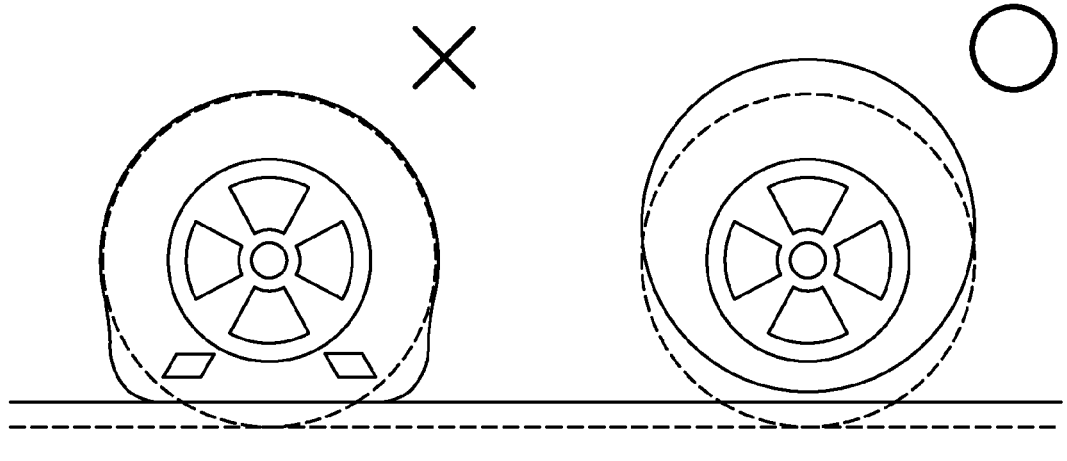

Shear deformation

Ground-contact shape

PNEUMATIC RADIAL TIRE FOR A PASSENGER VEHICLE AND METHOD OF USING THE SAME

CROSS REFERENCE TO RELATED APPLICATIONS

This application is a National Stage of International Application No. PCT/JP2012/005343, filed Aug. 24, 2012, claiming priority based on Japanese Patent Application Nos. 2011-185178, JP 2011-185279 and JP 2011-185195, filed Aug. 26, 2011, the contents of all of which are incorporated herein by reference in their entirety.

TECHNICAL FIELD

The present invention relates to a pneumatic radial tire for a passenger vehicle and a method of using the tire.

BACKGROUND ART

Bias tires having relatively narrower sectional widths had been predominantly used in vehicles until around 1960 because vehicles in those days were relatively lightweight, and the speed demanded for the vehicles were lower, resulting a less burden imposed on the tires. However, radial tires are predominant these days and those having larger widths and assuming flat shapes are particularly demanded due to increase in weight and speed of vehicles (see, for example, PTL 1).

However, the increase in a tire width sacrifices the vehicle space and thus degrades comfortability. This is a major problem particularly for electric vehicles that have been put on practical use in anticipation of future, considering situations where ensuring a space around tires has been becoming of great importance, because the electric vehicles are required to secure a space for accommodating driving components such as a motor for controlling a torque for rotating a tire about a drive shaft.

Further, there has been an increasing demand for lower fuel consumption along with increased interest in environmental issues. Here, it has been known to increase a diameter and a width of the tire in order to reduce a rolling resistance value (RR value) of the tire for better fuel efficiency. However, there is a problem that the increase in the diameter and width of the tire leads to an increase in tire weight and air resistance, which rather increases vehicle resistance and causes excessive tire loading capability.

CITATION LIST

Patent Literature

PTL 1: JP H7-40706 A

SUMMARY OF INVENTION

Technical Problem

The present invention aims at solving the problems described above and an object thereof is to provide a pneumatic radial tire for a passenger vehicle that is lightweight with less vehicle resistance and thus ensures excellent comfortability, and to provide a method of using the tire.

Solution to Problem

The inventors diligently studied to solve the aforementioned problems.

As a result, the inventors have found that it is extremely effective, for the purpose of improvement in fuel efficiency and comfortability of a radial tire, to appropriately control reduction in a width of the tire and the increase in a diameter, namely, a relationship between a tire cross-sectional width SW and a tire outer diameter OD.

The present invention has been contrived based on the aforementioned knowledge and a summary thereof is as follows:

(1) A pneumatic radial tire for a passenger vehicle having a carcass, which is composed of a ply of cords radially arranged and toroidally provided between a pair of bead cores, and a bead filler disposed outside the bead cores in a tire radial direction, wherein
when the radial tire is mounted on a rim and applied with internal pressure of at least 250 kPa,
with a tire cross-sectional width SW of smaller than 165 (mm), a ratio of the tire cross-sectional width SW to a tire outer diameter OD, SW/OD, is no more than 0.26,
with the tire cross-sectional width SW of 165 (mm) or larger, the tire cross-sectional width SW and the tire outer diameter OD satisfy a relational expression:

$$OD \geq 2.135 \times SW + 282.3, \text{ and}$$

a bead filler tire-width-direction cross-sectional area S1 is one to four times the size of a bead core tire-width-direction cross-sectional area S2.

(2) A pneumatic radial tire for a passenger vehicle having a carcass, which is composed of a ply of cords radially arranged and toroidally provided between a pair of bead cores, and a bead filler disposed outside the bead cores in a tire radial direction, wherein
when the radial tire is mounted on a rim and applied with internal pressure of at least 250 kPa, a tire cross-sectional width SW and a tire outer diameter OD satisfy a relational expression:

$$OD \geq -0.0187 \times SW^2 + 9.15 \times SW - 380, \text{ and}$$

a bead filler tire-width-direction cross-sectional area S1 is one to four times the size of a bead core tire-width-direction cross-sectional area S2.

(3) The pneumatic radial tire for a passenger vehicle according to (1) or (2) set forth above, wherein, when BFW represents a width of the bead filler in the tire width direction in a tire radial direction center position of the bead filler and BDW represents a maximum width of the bead core in the tire width direction, the following relational expression:

$$0.1 \leq BFW/BDW \leq 0.5$$

is satisfied.

(4) The pneumatic radial tire for a passenger vehicle according to any one of (1) to (3) set forth above, wherein, when BFH represents a height of the bead filler in the tire radial direction and SH represents a tire sectional height, the following relational expression:

$$0.1 \leq BFH/SH \leq 0.25$$

is satisfied.

(5) The pneumatic radial tire for a passenger vehicle according to any one of (1) to (4) set forth above, wherein BFH, the height of the bead filler in the tire radial direction, is no more than 45 mm.

(6) A method of using a pneumatic radial tire for a passenger vehicle, wherein the tire according to (1) or (2) set forth above having the internal pressure of at least 250 kPa is used.

(7) A pneumatic radial tire for a passenger vehicle including a carcass, which is composed of a ply of carcass cords radially arranged and toroidally provided between bead cores embedded in a pair of bead portions, and a pair of sidewall portions connected to the bead portions, wherein
when the tire is mounted on a rim and applied with internal pressure of at least 250 kPa,
with a tire cross-sectional width SW of smaller than 165 (mm), a ratio of the tire cross-sectional width SW to a tire outer diameter OD, SW/OD, is no more than 0.26,
with the tire cross-sectional width SW of 165 (mm) or larger, the tire cross-sectional width SW and the tire outer diameter OD satisfy a relational expression:

$$OD \geq 2.135 \times SW + 282.3, \text{ and}$$

a ratio Ts/Tb is 15% to 40%, the Ts representing a gauge of the sidewall portion in a maximum width portion of the tire and the Tb representing a bead width of the bead core in a tire radial direction center position.

(8) A pneumatic radial tire for a passenger vehicle including a carcass, which is composed of a ply of carcass cords radially arranged and toroidally provided between bead cores embedded in a pair of bead portions, and a pair of sidewall portions connected to the bead portions, wherein
when the tire is mounted on a rim and applied with internal pressure of at least 250 kPa, a tire cross-sectional width SW and a tire outer diameter OD satisfy a relational expression:

$$OD \geq -0.0187 \times SW2 + 9.15 \times SW - 380, \text{ and}$$

a ratio Ts/Tb is 15% to 40%, the Ts representing a gauge of the sidewall portion in a tire maximum width portion and the Tb representing a bead width of the bead core in a tire radial direction center position.

(9) The pneumatic radial tire for a passenger vehicle according to (7) or (8) set forth above, wherein the gauge Ts of the sidewall portion in the tire maximum width portion is no less than 1.5 mm.

(10) The pneumatic radial tire for a passenger vehicle according to any one of (7) to (9) set forth above, wherein a diameter Tbc of the bead core is 4 mm to 12 mm.

(11) A method of using a pneumatic radial tire for a passenger vehicle, wherein the tire according to (7) or (8) set forth above having internal pressure of at least 250 kPa is used.

(12) A pneumatic radial tire for a passenger vehicle including a carcass, which is composed of a ply of carcass cords radially arranged and toroidally provided between a pair of bead portions, and a pair of sidewall portions connected to the bead portions, wherein
when the tire is mounted on a rim and applied with internal pressure of at least 250 kPa,
with a tire cross-sectional width SW of smaller than 165 (mm), a ratio of the tire cross-sectional width SW to a tire outer diameter OD, SW/OD, is no more than 0.26,
with the tire cross-sectional width SW of 165 (mm) or larger, the tire cross-sectional width SW and the tire outer diameter OD satisfy a relational expression:

$$OD \geq 2.135 \times SW + 282.3, \text{ and}$$

a ratio Ts/Tc is 5 to 10, the Ts representing a gauge of the sidewall portion in a tire maximum width portion and Tc representing a diameter of the carcass cord.

(13) A pneumatic radial tire for a passenger vehicle including a carcass, which is composed of a ply of carcass cords radially arranged and toroidally provided between a pair of bead portions, and a pair of sidewall portions connected to the bead portions, wherein
when the tire is mounted on a rim and applied with internal pressure of at least 250 kPa, a tire cross-sectional width SW and a tire outer diameter OD satisfy a relational expression:

$$OD \geq -0.0187 \times SW2 + 9.15 \times SW - 380, \text{ and}$$

a ratio Ts/Tc is 5 to 10, the Ts representing a gauge of the sidewall portion in a tire maximum width portion and Tc representing a diameter of the carcass cord.

(14) The pneumatic radial tire for a passenger vehicle according to (12) or (13) set forth above, wherein, when Ta represents a distance in a tire width direction from a surface of the carcass code cord to a tire outer surface, a ratio Ta/Tc is 3 to 6.

(15) The pneumatic radial tire for a passenger vehicle according to any one of (12) to (14) set forth above, wherein the diameter Tc of the carcass code cord is 0.4 mm to 0.8 mm.

(16) A method of using a pneumatic radial tire for a passenger vehicle, wherein the tire according to (12) or (13) set forth above having internal pressure of at least 250 kPa is used.

Advantageous Effect of Invention

According to the present invention, a pneumatic radial tire for a passenger vehicle that is lightweight having less vehicle resistance and thus capable of providing excellent comfortability may be provided.

BRIEF DESCRIPTION OF DRAWINGS

FIGS. 3(a), (b) are diagrams illustrating tire deformations;

DESCRIPTION OF EMBODIMENTS

The following is a description of a process that led to a pneumatic radial tire for a passenger car (hereinafter, referred to as a tire) according to the present invention.

Figure 1A:
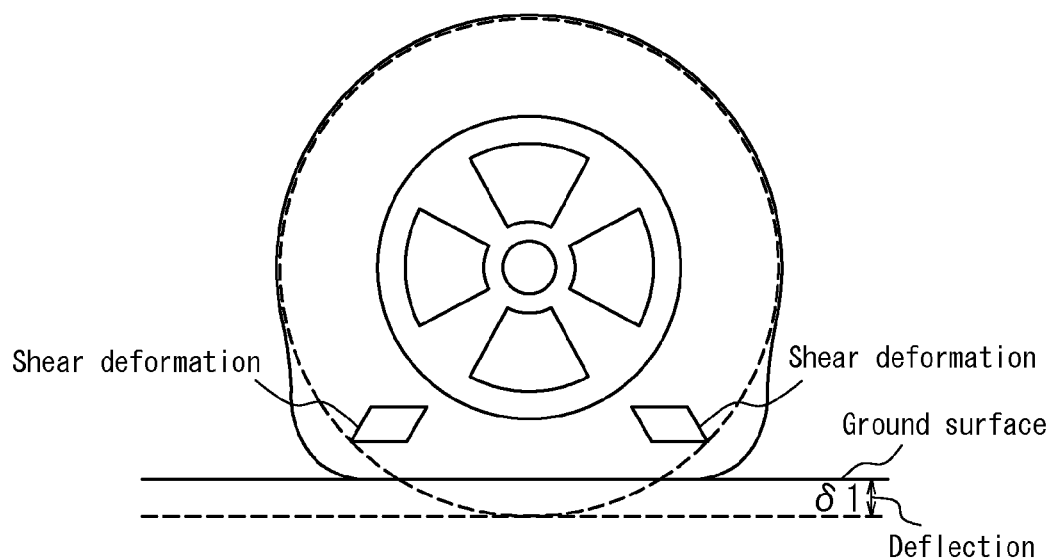
FIG. 1(a) is a side view of a tire.

FIG. 1(a) illustrates a tire crown portion bending upon application of a load. Due to the bending of the crown portion, as schematically illustrated in a parallelogram in FIG. 1(a), tread rubber undergoes shear deformation in a tire circumferential direction, which repeatedly occurs during rotation of the tire, causing energy loss and the increase in tire rolling resistance.

As such, in order to reduce a rolling resistance value, first, reduction in a deflection amount of the tire during ground contact becomes of importance.

Figure 1B:
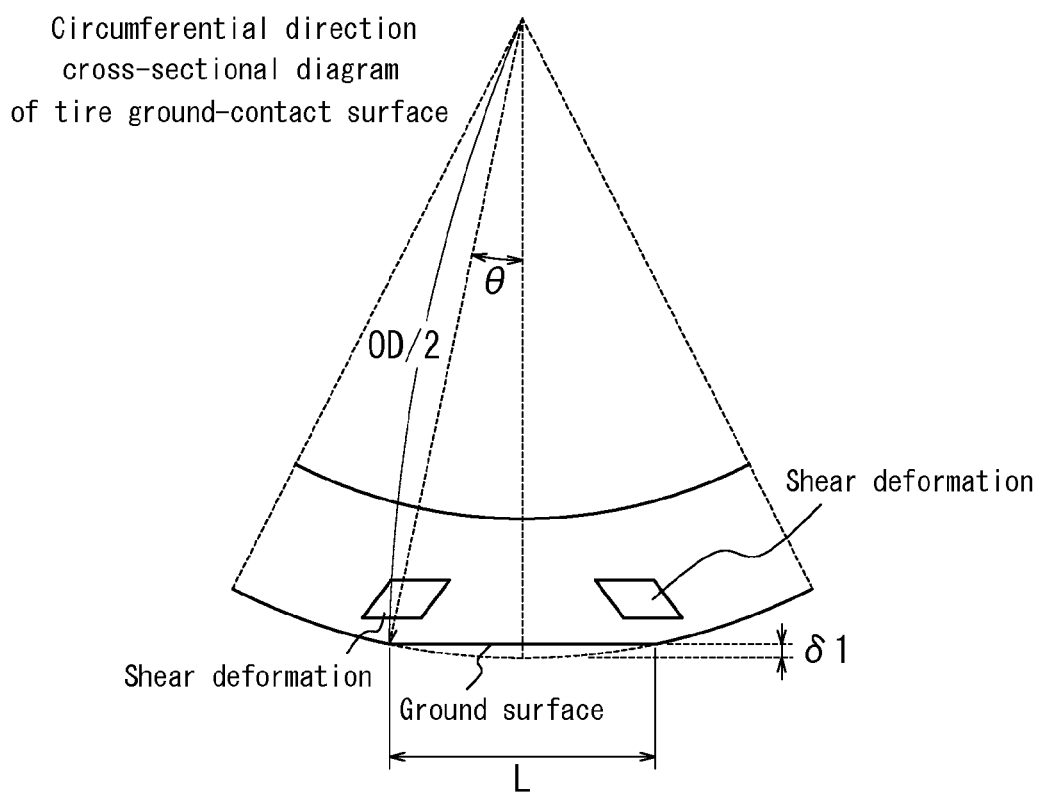
FIG. 1(b) is a cross-sectional view in a tire circumferential direction illustrating the proximity of a ground-contact surface of the tire.

FIG. 1(b) is a cross-sectional view in a circumferential direction of the tire in the proximity of a ground-contact surface thereof. As illustrated in FIG. 1(b), when OD (mm), $\delta_1$ (mm), and L (mm) represent a tire outer diameter, a deflection amount, and a ground-contact length in the circumferential direction, respectively, the deflection amount $\delta_1$ may be approximately represented by, in a geometrical manner, the following two formulae:

$$\delta_1 = (OD/2) \times (1 - \cos\theta) \quad \text{(Formula 1)}$$

$$\theta \approx \tan^{-1}\{(L/2)/(OD/2)\} \approx L/OD \quad \text{(Formula 2)}$$

Figure 2:
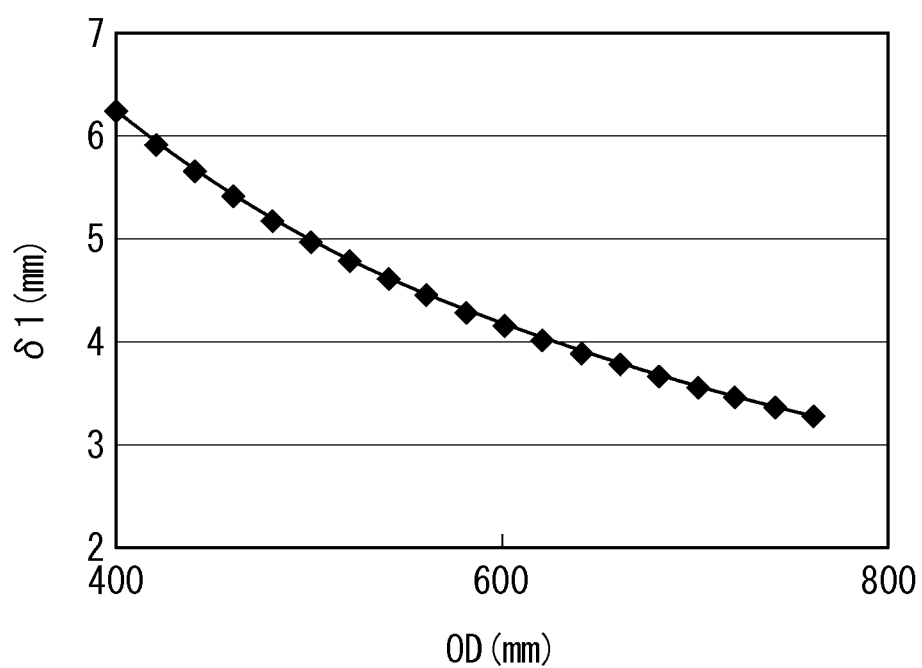
FIG. 2 is a graph illustrating a relationship between a tire outer diameter OD and a tire deflection amount δ1.

Also, FIG. 2 is a graph illustrating a relationship between the tire outer diameter OD and the deflection amount $\delta_1$ when conventional tires in various sizes are mounted on an application rim and applied with prescribed internal pressure and a maximum load.

Here, the "application rim" for the conventional tire is defined by industrial standards valid in areas where the tire is produced and used, such as JATMA (Japan Automobile Tire Manufacturers Association) YEAR BOOK in Japan, ETRTO (European Tyre and Rim Technical Organization) STANDARD MANUAL in Europe, and TRA (THE TIRE and RIM ASSOCIATION INC.) YEAR BOOK in the United States. Also, the "prescribed internal pressure" is based on a correspondence table of the application rim corresponding to a size of a radial ply tire as defined in the above-mentioned JATMAYEAR BOOK (Japan Automobile Tire Manufacturers Association Standards) and the like, the air pressure, and a load capacity. Further, the term "maximum load" means a maximum load (maximum load capacity) of a single tire in an appropriate size prescribed in the above-mentioned predetermined industrial standards.

From Formulae 1 and 2 set forth above and FIG. 2, it can be seen that, in order to reduce the deflection amount $\delta_1$, it is effective to increase the tire outer diameter OD.

That is, in order to reduce the tire rolling resistance from a viewpoint of suppression of the shear deformation of tread rubber in the tire circumferential direction, it is effective to increase a tire diameter.

Further, from the following Formula representing a tire belt tension, it can be seen that the tire belt tension increases along with the increase in the tire diameter.

$$T = (OD/2) \times P \quad \text{(Formula 3)}$$

Along with the increase in the tire belt tension, tire ring rigidity (rigidity for keeping a ring shape of the tire) also increases, which, as illustrated in FIGS. 3(a), (b), promotes deformation eccentrically moving the entire ring (i.e., eccentric deformation) while the tire is maintained in the ring shape. Thereby, deformation of the tread rubber is suppressed, reducing the tire rolling resistance value.

That is, the increase in the tire diameter is effective in reducing the tire rolling resistance value, also from a viewpoint of suppressing deformation of the ring shape of the tire.

Next, the inventors focused on the shear deformation of the tread rubber in the tire width direction.

Figure 4A:
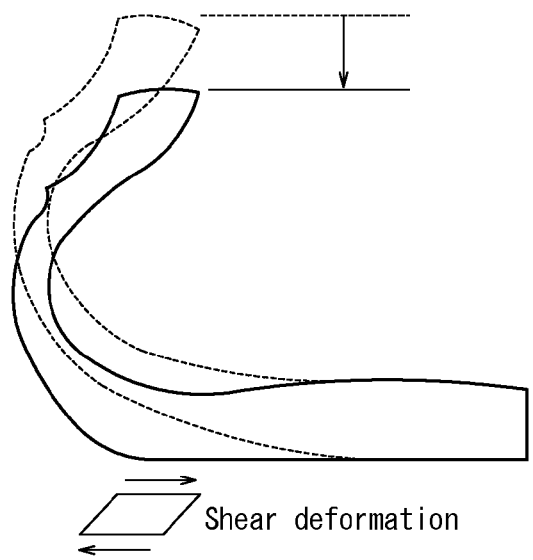
FIGS. 4(a), (b) are cross-sectional diagrams in a tire width direction illustrating tire deformations.

That is, deflection of the crown portion when the tire contacts the ground, as schematically illustrated by a parallelogram of FIG. 4(a), causes shear deformation of the tread rubber in the tire width direction, which repeatedly occurs during rotation of the tire, causing energy loss and the increase in the rolling resistance.

Figure 4B:
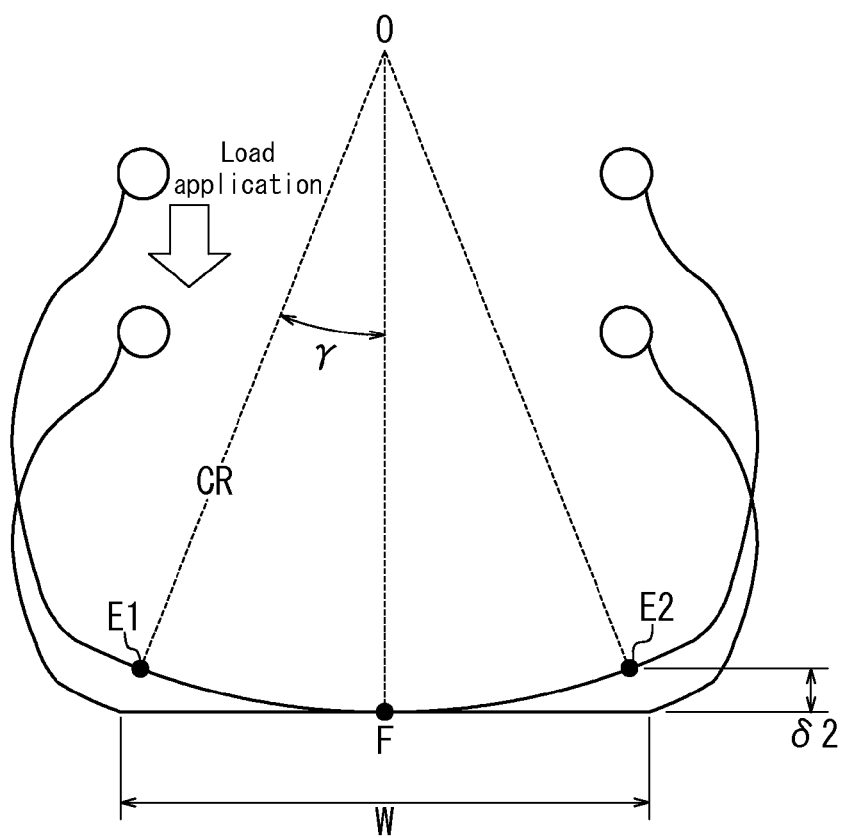

FIG. 4(b) is a cross-sectional view of a tire ground-contact surface in the tire width direction. As illustrated in FIG. 4(b), in the cross-section in the tire width direction, each of points E1 and E2 represents a contact end upon application of a maximum load defined for each vehicle wearing the tire, a point F represents a width direction center position, and W (mm) represents a width direction contact width.

Also, in a no-load state, CR (mm) represents a crown radius at each of the points E1 and E2 on a curve including the three points E1, E2, and F approximated by a circular arc in the width-direction cross-section, and O represents a center of a circle made on the basis of the circular arc. Here, in the width-direction cross-section, a line segment OE1 forms an angle γ(°) with respect to a tire equator plane.

Further, when a deflection amount $\delta_2$ (mm) (an amount of deflection of ground-contact ends in the width direction) represents a deflection amount upon application of a maximum load defined for each vehicle wearing the tires described above, the $\delta_2$ may be approximately expressed by the following formulae in a geometrical manner:

$$\delta_2 = CR \times (1 - \cos\gamma) \quad \text{(Formula 4)}$$

$$\gamma \approx \tan^{-1}\{(W/2)/CR\} \approx W/2CR \quad \text{(Formula 5)}$$

Figure 5:
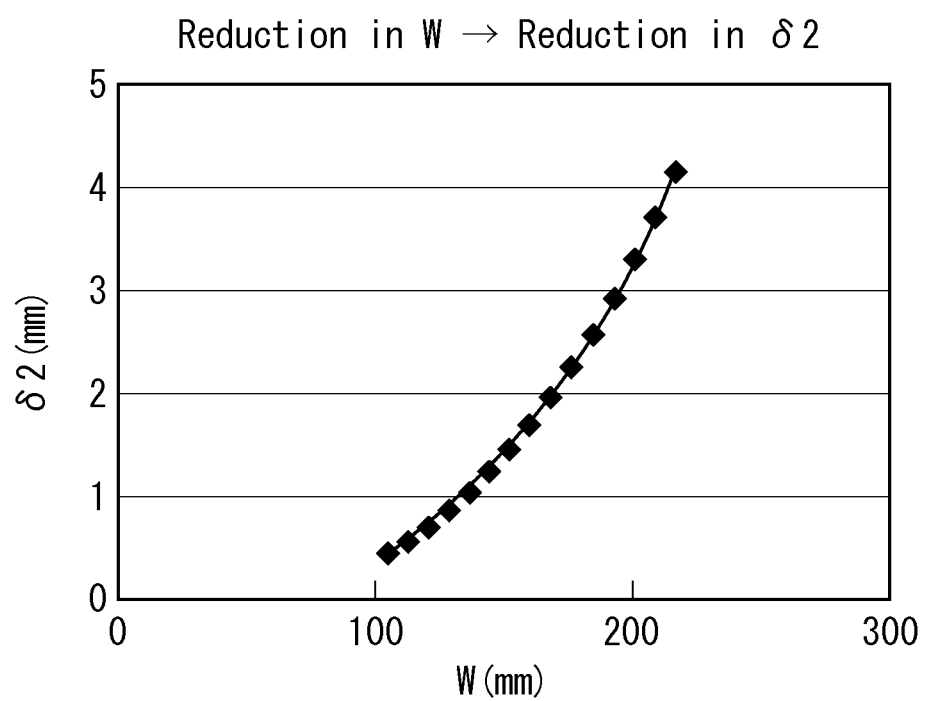
FIG. 5 is a graph illustrating a relationship between a ground-contact width W and a deflection amount δ2.

Also, FIG. 5 is a graph illustrating a relationship between the contact width W and the deflection amount $\delta_2$ when conventional tires in various sizes are mounted on the application rim and applied with the prescribed internal pressure and the maximum load.

As can be seen from Formulae 4, 5 set forth above and FIG. 5, reduction in the ground-contact width W may reduce the deflection amount $\delta_2$. That is, in order to reduce the tire rolling resistance from a viewpoint of suppression of the shear deformation of the tread rubber in the tire width direction, it is effective to reduce a tire width.

The reduction in the tire width is also effective to reduce tire weight.

As described above, it has been found that appropriate regulation of the increase in the tire diameter and the reduction in the tire width enables reduction in the tire rolling resistance value while reducing the tire weight.

Figure 6:
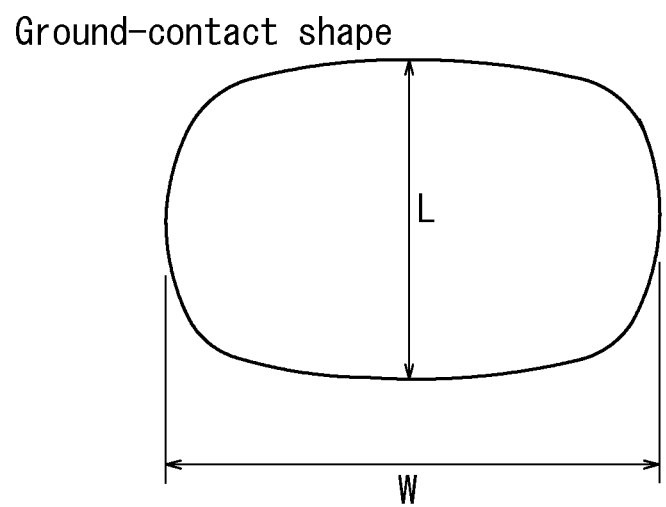
FIG. 6 is a diagram illustrating a relationship among a load, internal pressure, and a ground-contact area.

As illustrated in FIG. 6, incidentally, when L, W, P, and Lo represent the ground-contact length, the ground-contact width, the internal pressure, and a load on the tire, respectively, a relationship between a ground-contact area of the tire and the applied load satisfies the following relational expression:

$$Lo \approx W \times L \times P, \quad \text{(Formula 6)}$$

which is derived from an equilibrium-force condition.

Therefore, under a condition with a certain load applied on the tire and certain internal pressure, when the ground-contact width W of the tire is reduced so as to suppress the shear deformation of the tread rubber in the width direction and also to reduce the tire weight as described above, the ground-contact length L increases, as can be seen from the relational expression of a balance of Formula 6 set forth above.

Accordingly, it has been newly found that, according to Formulae 1, 2 set forth above, the increase in the deflection amount $\delta 1$ due to the increase in the ground-contact length L leads to the increase in the shear deformation of the tread rubber in the tire circumferential direction.

As such, the inventors have found that, as a method to suppress the increase in the ground-contact length while reducing the width of the tire, it is effective to use the tire with high internal pressure.

That is, based on the relational expression of Formula 6 set forth above, regardless of the reduction in the ground-contact width, the tire with high internal pressure may support an applied load without reducing the ground-contact length.

Figure 7A:
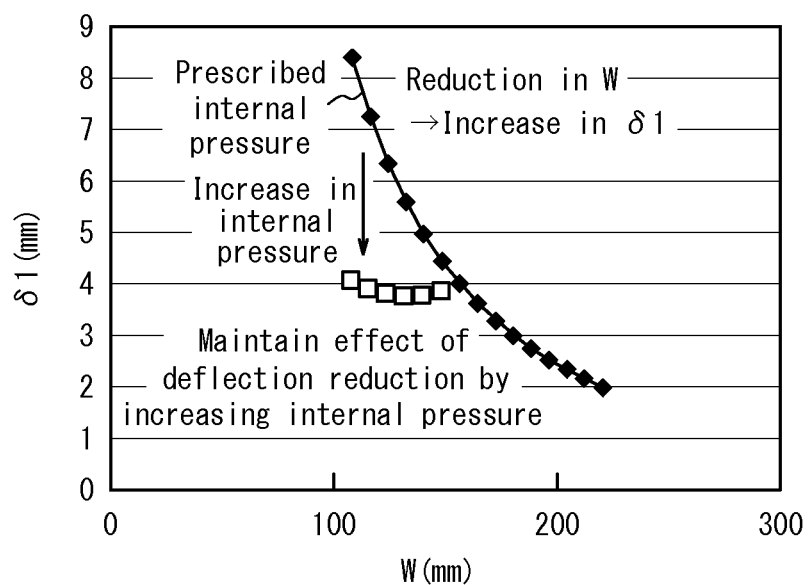
FIG. 7(a) is a graph illustrating the deflection amount δ1 of the tire having high internal pressure.
Figure 7B:
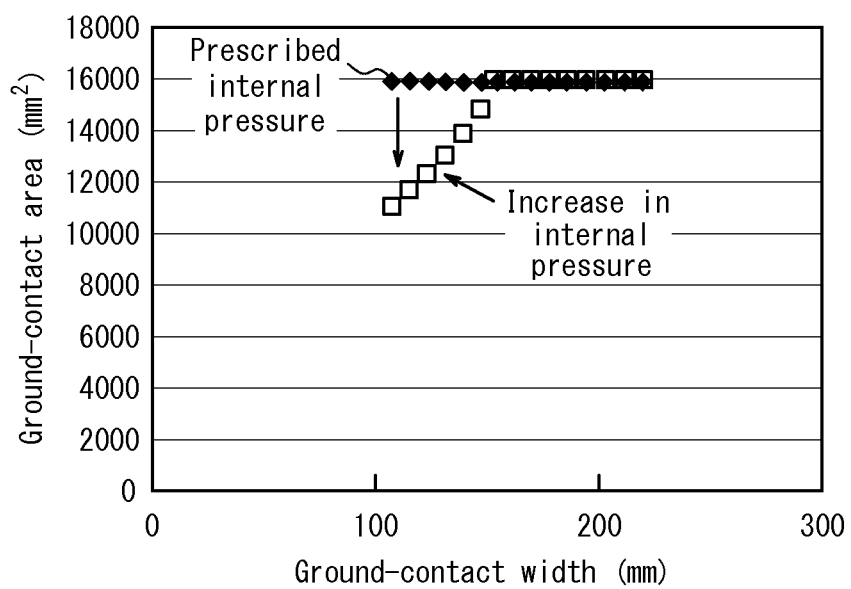
FIG. 7(b) is a graph illustrating the ground-contact area when the tire is applied with high internal pressure.

FIG. 7(a) is a graph illustrating a relationship between the ground-contact width W and the deflection amount $\delta 1$ of a tire of 195/65R15 in size mounted on the application rim and applied with the maximum load. FIG. 7(b) is a graph illustrating a relationship between the ground-contact width W and the ground-contact area of the tire of 195/65R15 in size mounted on the application rim and applied with the maximum load.

As illustrated in FIG. 7(a), when the tire with prescribed internal pressure is used, the ground-contact width reduces and thus the deflection amount $\delta 1$ increases, reducing the effect to reduce the shear deformation of the tread rubber in the circumferential direction. As illustrated in FIG. 7(b), also, the ground-contact area remains approximately the same regardless of the reduction in the ground-contact width while the ground-contact length increases.

On the other hand, by using the tire with high internal pressure, the increase in the deflection amount may be suppressed regardless of the reduction in the ground-contact width as illustrated in FIG. 7(a) and, by reducing the ground-contact width, the ground-contact area may also be reduced as illustrated in FIG. 7(b).

Accordingly, the shear deformation of the tread rubber in the circumferential direction when the tire contacts the ground may be suppressed, thus reducing the tire rolling resistance value.

Figures 8A, 8B:
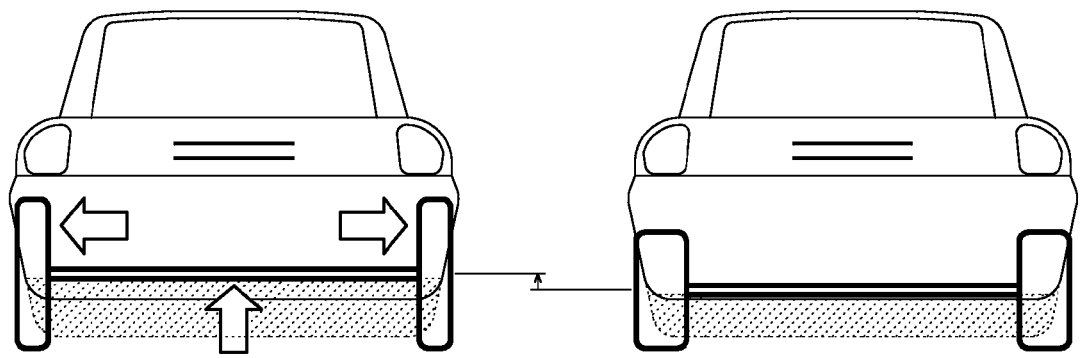
FIGS. 8(a), (b) are diagrams illustrating vehicle space ensured by the tire with a larger diameter and a narrower width.

Further, as illustrated in FIGS. 8(a), (b), the reduction in the tire width may ensure a space inside/outside a vehicle; in particular, a space for accommodating driving components in the proximity of an inner side of the tire. Also, the increase in the diameter of the radial tire increases a height of a drive shaft and an under-chassis space, securing spaces for a car trunk and the like and also a space for accommodating driving units.

On the basis of the findings described above, the inventors investigated for specific conditions under which the increase in the tire diameter, the reduction in the tire width, and application of high internal pressure may achieve both the reduction in the tire rolling resistance value and the tire weight.

First, as a referential tire for evaluation, a tire of 195/65R15 in size was prepared, because such a tire has been used for the most common types of vehicles and thus suitable for comparison of tire performance.

Tires in various sizes were also prepared, which were mounted on a rim with a width corresponding to a bead width of the tire and applied with the internal pressure of 220 kPa, or applied with high internal pressure. Then, tests were conducted as described below.

Table 1 shows specifications of each of the tires. Other specifications such as internal structures of the tires that are not shown in Table 1 are similar to those of common tires. Each of the tires includes a carcass composed of a ply of cords radially arranged and toroidally provided between a pair of bead portions.

With regard to the tire size, the inventors studied using tires in various sizes including conventional sizes prescribed in JATMA (the tire standard in Japan), TRA (the tire standard in the United States), ETRTO (the tire standard in EU) and the like, as well as using tires in non-standard sizes.

Especially assuming a sporty application, test tires 27 to 33 with a tire cross-sectional width SW of at least 175 (mm) were also prepared.

Here, the test tires 27 to 33 were compared with a tire of 225/45R17 in size (Reference Tire 2), which is larger than the tire of 195/65R15 in size (Reference Tire 1) by an inch.

TABLE 1

| | | Tire Size | Ratio SW/OD |
|---|---|---|---|
| Conventional Tire | Conventional Tire 1 | 145/70R12 | 0.29 |
| | Conventional Tire 2 | 155/55R14 | 0.29 |
| | Conventional Tire 3 | 165/60R14 | 0.30 |
| | Conventional Tire 4 | 175/65R14 | 0.30 |
| | Conventional Tire 5 | 185/60R15 | 0.31 |
| | Reference Tire 1 | 195/65R15 | 0.31 |
| | Conventional Tire 6 | 205/55R16 | 0.32 |
| | Conventional Tire 7 | 215/60R16 | 0.32 |
| | Conventional Tire 8 | 225/55R17 | 0.33 |
| | Conventional Tire 9 | 245/45R18 | 0.36 |
| | Conventional Tire 10 | 155/65R13 | 0.29 |
| | Reference Tire 2 | 225/45R17 | 0.35 |
| Test tire | Test tire 1 | 165/65R19 | 0.24 |
| | Test tire 2 | 155/65R18 | 0.24 |
| | Test tire 3 | 145/65R19 | 0.22 |
| | Test tire 4 | 135/65R19 | 0.21 |
| | Test tire 5 | 125/65R19 | 0.19 |
| | Test tire 6 | 175/55R22 | 0.23 |
| | Test tire 7 | 165/55R20 | 0.24 |
| | Test tire 8 | 155/55R19 | 0.24 |
| | Test tire 9 | 145/55R20 | 0.22 |
| | Test tire 10 | 135/55R20 | 0.21 |
| | Test tire 11 | 125/55R20 | 0.19 |
| | Test tire 12 | 175/45R23 | 0.24 |
| | Test tire 13 | 165/45R22 | 0.23 |
| | Test tire 14 | 155/45R21 | 0.23 |
| | Test tire 15 | 145/45R21 | 0.22 |
| | Test tire 16 | 135/45R21 | 0.21 |
| | Test tire 17 | 145/60R16 | 0.25 |
| | Test tire 18 | 155/60R17 | 0.25 |
| | Test tire 19 | 165/55R19 | 0.25 |
| | Test tire 20 | 155/45R18 | 0.26 |
| | Test tire 21 | 165/55R18 | 0.26 |

TABLE 1-continued

| | Tire Size | Ratio SW/OD |
|---|---|---|
| Test tire 22 | 175/55R19 | 0.26 |
| Test tire 23 | 115/50R17 | 0.21 |
| Test tire 24 | 105/50R16 | 0.21 |
| Test tire 25 | 135/60R17 | 0.23 |
| Test tire 26 | 185/60R20 | 0.25 |
| Test tire 27 | 185/50R20 | 0.27 |
| Test tire 28 | 195/60R19 | 0.27 |
| Test tire 29 | 175/60R18 | 0.26 |
| Test tire 30 | 195/55R20 | 0.27 |
| Test tire 31 | 215/50R21 | 0.29 |
| Test tire 32 | 205/55R20 | 0.28 |
| Test tire 33 | 185/45R22 | 0.26 |

<Rolling Resistance Value (RR Value)>

Each of the tires set forth above was mounted on the rim with the width corresponding to the bead width of the tire to obtain a tire-rim assembly. The tire was then applied with the maximum load prescribed for each vehicle wearing the tire and run at a drum rotation speed of 100 km/h, for measurement of the rolling resistance.

Results of an evaluation are shown as indices relative to that of Reference Tire 1 set to 100. The smaller the index, the smaller the rolling resistance.

<Tire Weight>

Weight of each of the tire was measured and is shown as index relative to that of Reference Tire 1 set to 100 (the smaller the index, the lighter the weight).

Results of an evaluation are shown in Tables 2 and 3 below, based on which the results are further illustrated in FIGS. 10 to 13.

TABLE 2

| | 220 kPa | RR Value (INDEX) | Internal Pressure (kPa) | W (mm) | L (mm) | OD (mm) | δ1 (mm) | Tire Weight (INDEX) |
|---|---|---|---|---|---|---|---|---|
| Conventional Tire | Conventional Tire 1 | 120 | 220 | 111.65 | 162.8 | 507.8 | 12.1 | 61.3 |
| | Conventional Tire 2 | 125 | 220 | 119.35 | 152.3 | 526.1 | 10.4 | 61.9 |
| | Conventional Tire 3 | 118 | 220 | 127.05 | 143.1 | 553.6 | 8.8 | 71.6 |
| | Conventional Tire 4 | 109 | 220 | 134.75 | 134.9 | 583.1 | 7.5 | 82.5 |
| | Conventional Tire 5 | 106 | 220 | 142.45 | 127.6 | 603 | 6.5 | 87.4 |
| | Reference Tire 1 | 100 | 220 | 150.15 | 121.1 | 634.5 | 5.6 | 100 |
| | Conventional Tire 6 | 101 | 220 | 157.85 | 115.2 | 631.9 | 5.1 | 98.3 |
| | Conventional Tire 7 | 93 | 220 | 164.65 | 110.4 | 664.4 | 4.5 | 111.9 |
| | Conventional Tire 8 | 85 | 220 | 170.85 | 106.4 | 679.3 | 4.1 | 124.7 |
| | Conventional Tire 9 | 80 | 220 | 176.65 | 102.9 | 677.7 | 3.8 | 129.4 |
| | Conventional Tire 10 | 90 | 220 | 170.8 | 106.4 | 634.3 | 4.4 | 116.5 |
| | Reference Tire 2 | 90 | 220 | 170.8 | 106.5 | 634.3 | 4.37 | 116 |
| Test Tire | Test Tire 1 | 98.9 | 220 | 127.1 | 143.1 | 697.1 | 7.1 | 93 |
| | Test Tire 2 | 106.7 | 220 | 119.4 | 152.3 | 658.7 | 8.5 | 82.5 |
| | Test Tire 3 | 107.5 | 220 | 111.7 | 162.8 | 671.1 | 9.5 | 78.6 |
| | Test Tire 4 | 111.7 | 220 | 104 | 174.9 | 658.1 | 11 | 71.8 |
| | Test Tire 5 | 116 | 220 | 96.3 | 188.9 | 645.1 | 13 | 65.2 |
| | Test Tire 6 | 88.3 | 220 | 134.8 | 134.9 | 751.3 | 5.9 | 99.7 |
| | Test Tire 7 | 99.3 | 220 | 128.3 | 141.7 | 689.5 | 7.1 | 86.3 |
| | Test Tire 8 | 106.8 | 220 | 120.5 | 150.8 | 653.1 | 8.4 | 76.8 |
| | Test Tire 9 | 107.4 | 220 | 112.8 | 161.2 | 667.5 | 9.3 | 73.4 |
| | Test Tire 10 | 111.4 | 220 | 105 | 173.2 | 656.5 | 10.9 | 67.2 |
| | Test Tire 11 | 115.4 | 220 | 97.2 | 187 | 645.5 | 12.8 | 61.2 |
| | Test Tire 12 | 89 | 220 | 136.1 | 133.6 | 741.7 | 5.9 | 92 |
| | Test Tire 13 | 96.3 | 220 | 129.6 | 140.3 | 707.3 | 6.8 | 82.7 |
| | Test Tire 14 | 103.5 | 220 | 121.7 | 149.3 | 672.9 | 8 | 73.9 |
| | Test Tire 15 | 107.2 | 220 | 113.9 | 159.6 | 663.9 | 9.2 | 68.2 |
| | Test Tire 16 | 111 | 220 | 106 | 171.5 | 654.9 | 10.7 | 62.7 |
| | Test Tire 17 | 102.7 | 220 | 114.6 | 158.7 | 580.4 | 10.2 | 65.9 |
| | Test Tire 18 | 100.1 | 220 | 122.5 | 148.4 | 617.8 | 8.5 | 75 |
| | Test Tire 19 | 94.2 | 220 | 130.4 | 139.4 | 664.1 | 7 | 83.1 |
| | Test Tire 20 | 105 | 220 | 122.5 | 148.4 | 596.7 | 8.8 | 65.5 |
| | Test Tire 21 | 96.2 | 220 | 130.4 | 139.4 | 638.7 | 7.3 | 79.9 |
| | Test Tire 22 | 93.6 | 220 | 138.5 | 131.3 | 675.1 | 6.2 | 89.6 |
| | Test Tire 23 | 118 | 220 | 92.0 | 197.6 | 546.8 | 16.3 | 48.2 |
| | Test Tire 24 | 120 | 220 | 89.3 | 203.7 | 511.4 | 18.2 | 41.2 |
| | Test Tire 25 | 113 | 220 | 108.0 | 168.3 | 593.8 | 11.3 | 65.9 |
| | Test Tire 26 | 102 | 220 | 138.8 | 131.0 | 730 | 5.7 | 109.4 |
| | Test Tire 27 | 89.2 | 220 | 138.8 | 131.0 | 693.0 | 6.0 | 104.7 |
| | Test Tire 28 | 90.9 | 220 | 146.3 | 124.3 | 716.6 | 5.3 | 109.5 |
| | Test Tire 29 | 92.9 | 220 | 131.3 | 138.5 | 667.2 | 7.0 | 102.4 |
| | Test Tire 30 | 95.8 | 220 | 136.5 | 133.2 | 722.5 | 6.0 | 106.9 |
| | Test Tire 31 | 81.9 | 220 | 150.5 | 120.8 | 748.4 | 4.8 | 114.1 |

TABLE 2-continued

| 220 kPa | RR Value (INDEX) | Internal Pressure (kPa) | W (mm) | L (mm) | OD (mm) | δ1 (mm) | Tire Weight (INDEX) |
|---|---|---|---|---|---|---|---|
| Test Tire 32 | 85.4 | 220 | 143.5 | 126.7 | 733.5 | 5.4 | 112.0 |
| Test Tire 33 | 91.4 | 220 | 131.3 | 138.5 | 716.3 | 6.5 | 102.0 |

TABLE 3

| High Internal Pressure | | RR Value (INDEX) | Internal Pressure (kPa) | W (mm) | L (mm) | OD (mm) | δ1 (mm) | Tire Weight (INDEX) |
|---|---|---|---|---|---|---|---|---|
| Conventional Tire | Conventional Tire 1 | 108 | 295 | 111.71 | 121.4 | 507.8 | 7 | 61.3 |
| | Conventional Tire 2 | 111.3 | 275 | 119.4 | 121.9 | 526.1 | 6.8 | 61.9 |
| | Conventional Tire 3 | 108.6 | 260 | 127.1 | 121.1 | 553.6 | 6.4 | 71.6 |
| | Conventional Tire 4 | 103.6 | 245 | 134.8 | 121.2 | 583.1 | 6.1 | 82.5 |
| | Conventional Tire 5 | 103.9 | 230 | 142.5 | 122.1 | 603 | 6 | 87.4 |
| | Reference Tire 1 | 100 | 220 | 150.2 | 121.1 | 634.5 | 5.6 | 100 |
| | Conventional Tire 6 | 101 | 220 | 157.9 | 115.2 | 631.9 | 5.1 | 98.3 |
| | Conventional Tire 7 | 93 | 220 | 164.7 | 110.4 | 664.4 | 4.5 | 111.9 |
| | Conventional Tire 8 | 85 | 220 | 170.9 | 106.4 | 679.3 | 4.1 | 115.9 |
| | Conventional Tire 9 | 80 | 220 | 176.7 | 102.9 | 677.7 | 3.8 | 117.7 |
| | Conventional Tire 10 | 90 | 220 | 170.8 | 106.4 | 634.3 | 4.4 | 116.5 |
| | Reference Tire 2 | 90 | 220 | 170.8 | 106.5 | 634.3 | 4.37 | 116 |
| Test Tire | Test Tire 1 | 92.2 | 260 | 127.1 | 121.1 | 697.1 | 5.1 | 93 |
| | Test Tire 2 | 96 | 275 | 119.4 | 120.6 | 658.7 | 5.4 | 82.5 |
| | Test Tire 3 | 92.4 | 295 | 111.7 | 121.4 | 671.1 | 5.4 | 78.6 |
| | Test Tire 4 | 91.6 | 315 | 104 | 121 | 658.1 | 5.4 | 71.8 |
| | Test Tire 5 | 88.2 | 340 | 96.3 | 121.2 | 645.1 | 5.5 | 65.2 |
| | Test Tire 6 | 84.8 | 345 | 134.8 | 120.7 | 751.3 | 4.8 | 99.7 |
| | Test Tire 7 | 92.6 | 260 | 128.3 | 120.8 | 689.5 | 5.2 | 86.3 |
| | Test Tire 8 | 96.2 | 275 | 120.5 | 121.1 | 653.1 | 5.5 | 76.8 |
| | Test Tire 9 | 92.3 | 290 | 112.8 | 121.1 | 667.5 | 5.4 | 73.4 |
| | Test Tire 10 | 92.4 | 310 | 105 | 121.7 | 656.5 | 5.5 | 67.2 |
| | Test Tire 11 | 87.7 | 340 | 97.2 | 121 | 645.5 | 5.5 | 61.2 |
| | Test Tire 12 | 85.5 | 250 | 136.1 | 120.9 | 741.7 | 4.8 | 92 |
| | Test Tire 13 | 89.7 | 255 | 129.6 | 121 | 707.3 | 5.1 | 82.7 |
| | Test Tire 14 | 93.2 | 270 | 121.7 | 121.2 | 672.9 | 5.3 | 73.9 |
| | Test Tire 15 | 92.2 | 290 | 113.9 | 121.1 | 663.9 | 5.4 | 68.2 |
| | Test Tire 16 | 92.1 | 310 | 106 | 121.3 | 654.9 | 5.5 | 62.7 |
| | Test Tire 17 | 93.9 | 290 | 114.6 | 120.4 | 580.4 | 6 | 65.9 |
| | Test Tire 18 | 92.1 | 270 | 122.5 | 120.9 | 617.8 | 5.7 | 75 |
| | Test Tire 19 | 89.4 | 255 | 130.4 | 120.3 | 664.1 | 5.3 | 83.1 |
| | Test Tire 20 | 92.1 | 270 | 122.5 | 120.9 | 596.2 | 5.9 | 65.5 |
| | Test Tire 21 | 89.4 | 255 | 130.4 | 120.3 | 638.7 | 5.5 | 79.9 |
| | Test Tire 22 | 88.7 | 250 | 131.3 | 121.9 | 675.1 | 5.3 | 89.6 |
| | Test Tire 23 | 86.7 | 350 | 92.0 | 124.2 | 546.8 | 6.8 | 48.2 |
| | Test Tire 24 | 94.1 | 350 | 89.3 | 128.0 | 511.4 | 7.66 | 41.2 |
| | Test Tire 25 | 85.6 | 300 | 108.0 | 123.4 | 593.8 | 6.22 | 65.9 |
| | Test Tire 26 | 73.0 | 270 | 138.8 | 106.7 | 730 | 3.84 | 109.4 |
| | Test Tire 27 | 80.0 | 270 | 104.7 | 106.8 | 693.0 | 4.0 | 104.7 |
| | Test Tire 28 | 81.3 | 258 | 109.5 | 106.7 | 716.6 | 3.9 | 109.5 |
| | Test Tire 29 | 84.7 | 286 | 102.4 | 106.6 | 667.2 | 4.2 | 102.4 |
| | Test Tire 30 | 83.3 | 277 | 106.9 | 105.8 | 722.5 | 3.8 | 106.9 |
| | Test Tire 31 | 75.0 | 250 | 114.1 | 106.3 | 748.4 | 3.7 | 114.1 |
| | Test Tire 32 | 78.7 | 263 | 112.0 | 106.0 | 733.5 | 3.8 | 112.0 |
| | Test Tire 33 | 86.7 | 285 | 100.0 | 106.9 | 716.3 | 3.9 | 102.0 |

Also, by using the test tires 8, 15, 20, and 31 with various internal pressure, the tests for evaluation of the tire rolling resistance value were conducted in the method described above.

Figure 9:
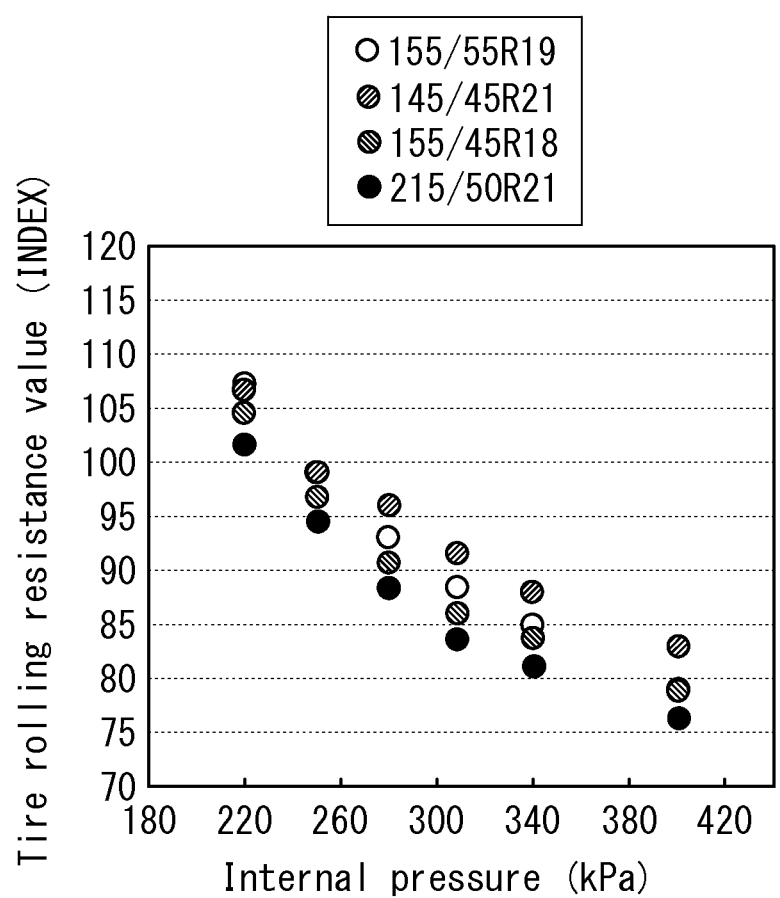
FIG. 9 is a graph illustrating a relationship between the tire internal pressure and a tire rolling resistance value (RR value)

Results of the an evaluation are shown in Table 4 and FIG. 9.

TABLE 4

| Internal Pressure (kPa) | Tire Size | | | |
|---|---|---|---|---|
| | 145/45R21 | 155/55R19 | 155/45R18 | 215/50R21 |
| | RR Value (INDEX) | | | |
| 220 | 106.8 | 107.2 | 105 | 102 |
| 250 | 99 | 99 | 97 | 95 |
| 280 | 96 | 93 | 91 | 88 |
| 310 | 91.8 | 88.5 | 87 | 84 |
| 340 | 88 | 85 | 84 | 81 |
| 400 | 83 | 79 | 79 | 77 |

Figure 10A:
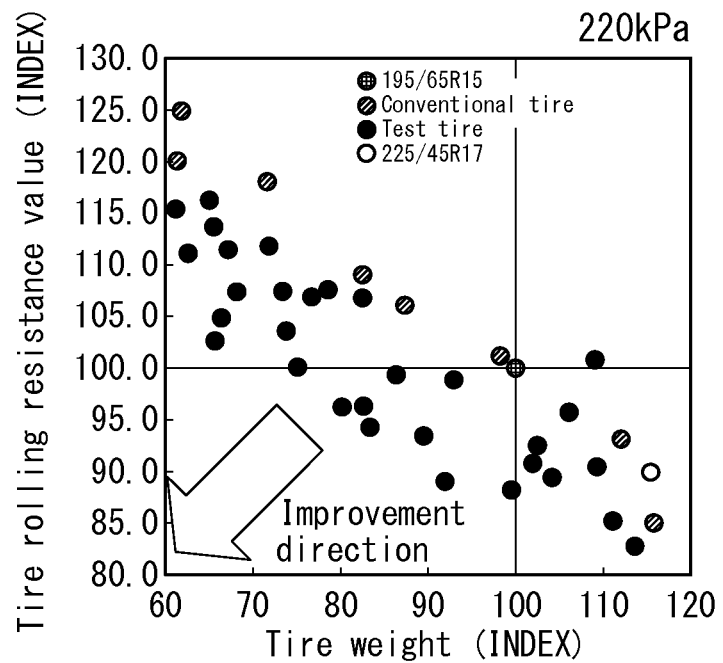
FIGS. 10(a), (b) are graphs illustrating weight and the rolling resistance value of each tire.
Figure 10B:
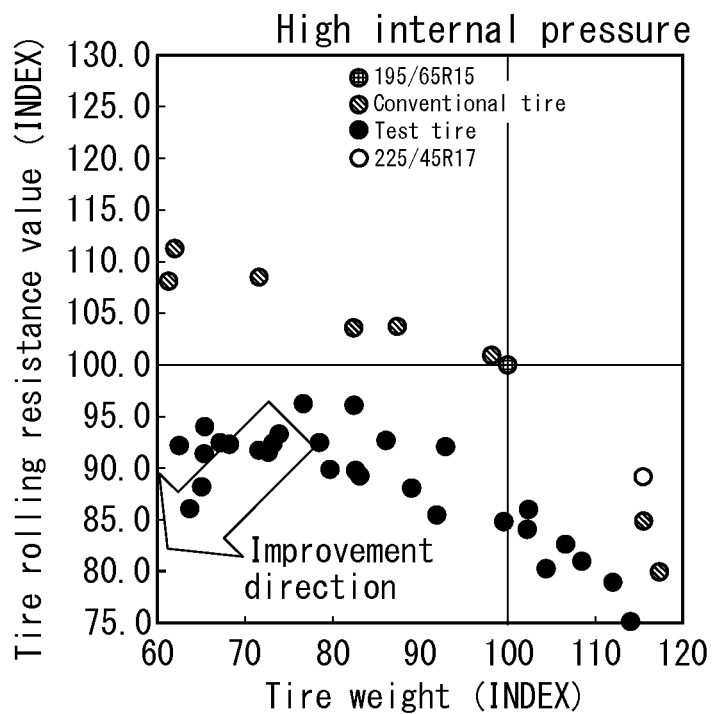

From Tables 2 to 4 and FIGS. 9, 10(a), (b), it can be seen that, when the test tires 1 to 26 with the internal pressure of at least 250 kPa are used, both the tire rolling resistance value and the tire weight may be reduced comparing to those of Reference Tire 1. It can also be seen that, when the test tires 27 to 33 with the internal pressure of at least 250 kPa are used, both the tire rolling resistance value and the tire weight may be reduced comparing to those of Reference Tire 2.

Note that the internal pressure is preferably no more than 350 kPa.

Here, the inventors have studied in more detail about sizes of the test tires 1 to 33 that allow reduction in both the tire rolling resistance value and the tire weight.

Figure 14A:
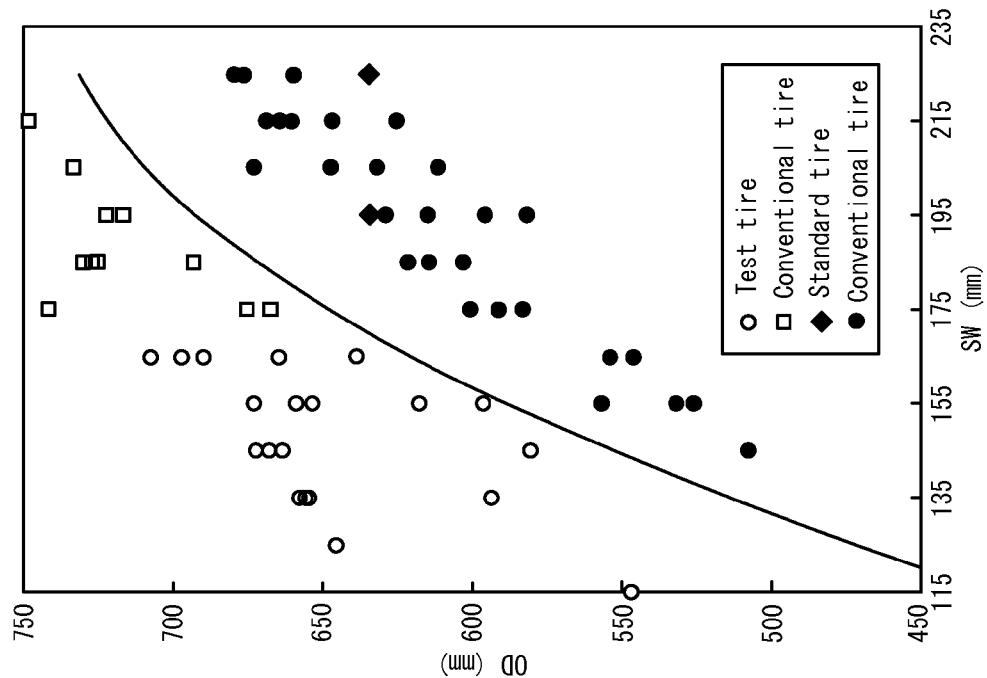
FIGS. 14(a), (b) are graphs illustrating a relationship between SW and OD of test tires and conventional tires.

FIGS. 14(a), (b) are graphs illustrating a relationship of a cross-sectional width SW (mm) and an outer diameter OD (mm) of the test tires and the conventional tires.

As illustrated in FIG. 14(a), when the cross-sectional width SW is 165 (mm) or smaller, a ratio SW/OD of the test tires are no more than 0.26. That is, it can be seen that, when the internal pressure is set to 250 kPa or more, tires with the ratio SW/OD of no more than 0.26 may reduce both the tire rolling resistance and the tire weight.

As illustrated in FIG. 14(a), also, when the cross-sectional width SW is 165 (mm) or greater, the cross-sectional width SW and the outer diameter OD of the test tire satisfy the following relational expression:

$$OD \geq 2.135 \times SW + 282.3$$

That is, when the cross-sectional width SW is 165 (mm) or greater, the tires with the internal pressure of 250 kPa or more that satisfy the above relational expression may reduce both the tire rolling resistance value and the tire weight.

Figure 14B:
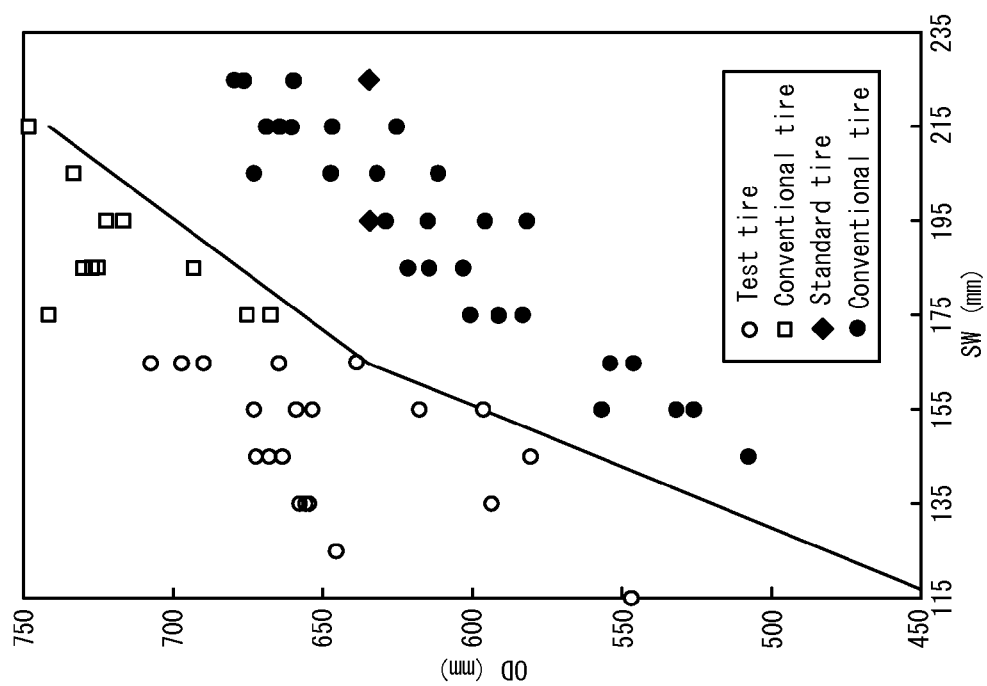

As illustrated in FIG. 14 (b), further, as a result of fitting using a quadratic curve boundary of a tire size that enables reduction in both the tire rolling resistance value and the tire weight in conjunction with the tire with SW of smaller than 165 (mm) and the tire with SW of 165 (mm) or greater, it was found that a tire that satisfies the following relational expression:

$$OD \geq -0.0187 \times SW^2 + 9.15 \times SW - 380$$

may reduce both the tire rolling resistance value and the tire weight.

In order to reduce both the tire rolling resistance value and the tire weight together, SW/OD≤0.26 is preferably satisfied, and SW/OD≤0.24 is particularly preferably satisfied.

Figure 11A:
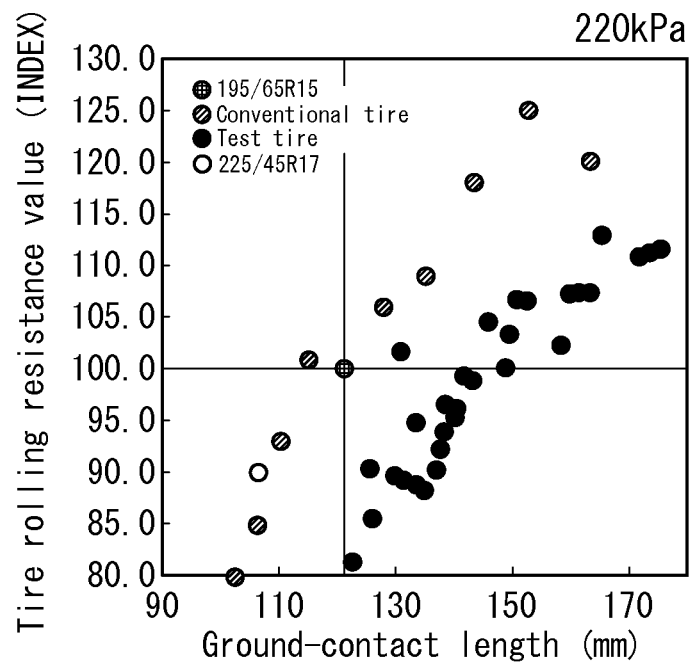
FIGS. 11(a), (b) are graphs illustrating a ground-contact length and the rolling resistance value of each tire.
Figure 11B:
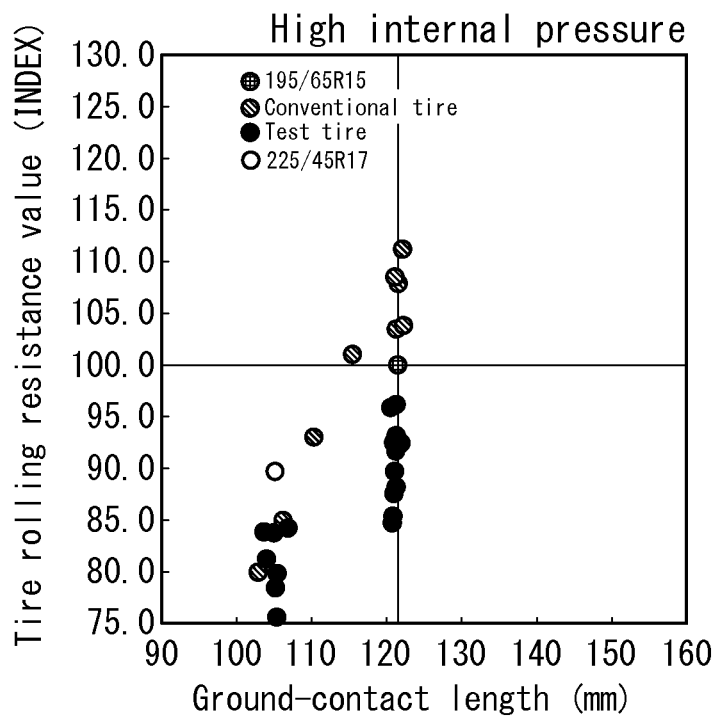

Also, from Tables 2, 3 and FIGS. 11(a), (b), it can be seen that applying high internal pressure may suppress the increase in the ground-contact length caused by the reduction in the ground-contact width, such that the ground-contact length becomes similar to that of Reference Tires.

Figure 12A:
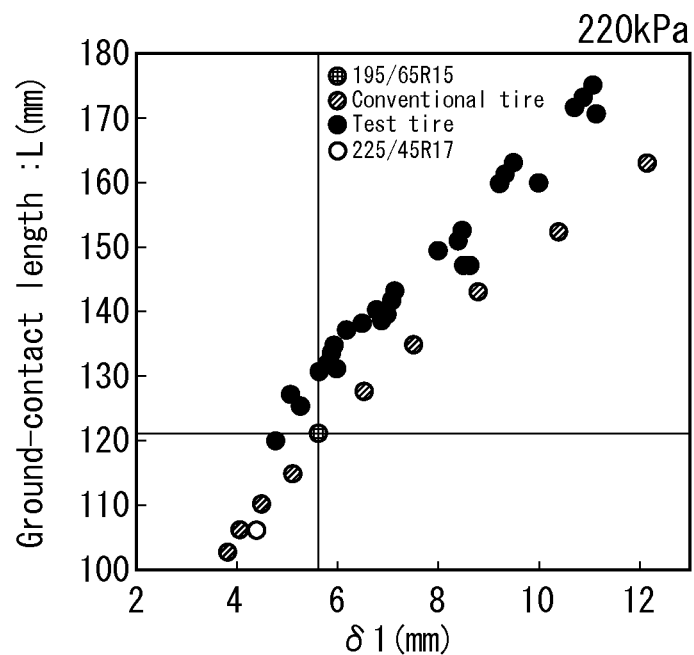
FIGS. 12(a), (b) are graphs illustrating the deflection amount δ1 and the ground-contact length of each tire.
Figure 12B:
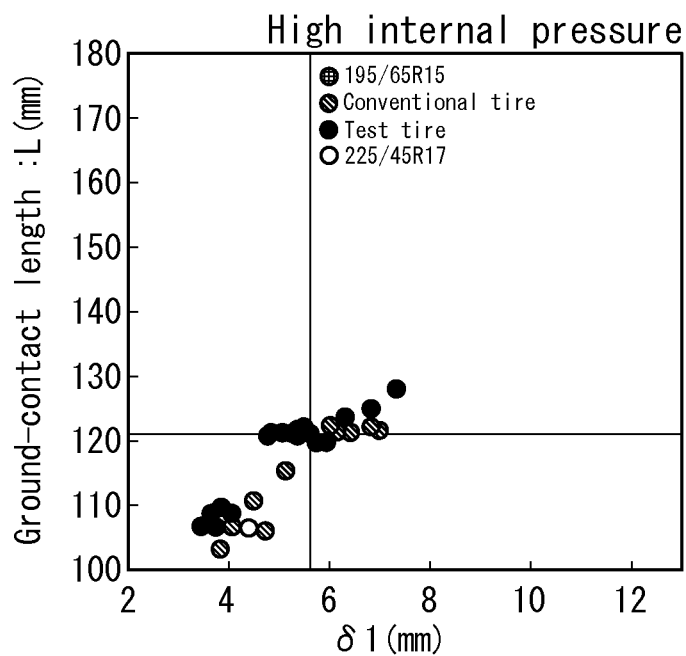

As can be seen in Table 2 and FIG. 12(a), further, when the internal pressure is at 220 kPa, reducing the ground-contact width increases the ground-contact length and the deflection amount δ1. As can be seen in Table 2 and FIG. 12(b), on the other hand, applying high internal pressure suppresses the increase in the ground-contact length, reducing the deflection amount δ1.

Figure 13:
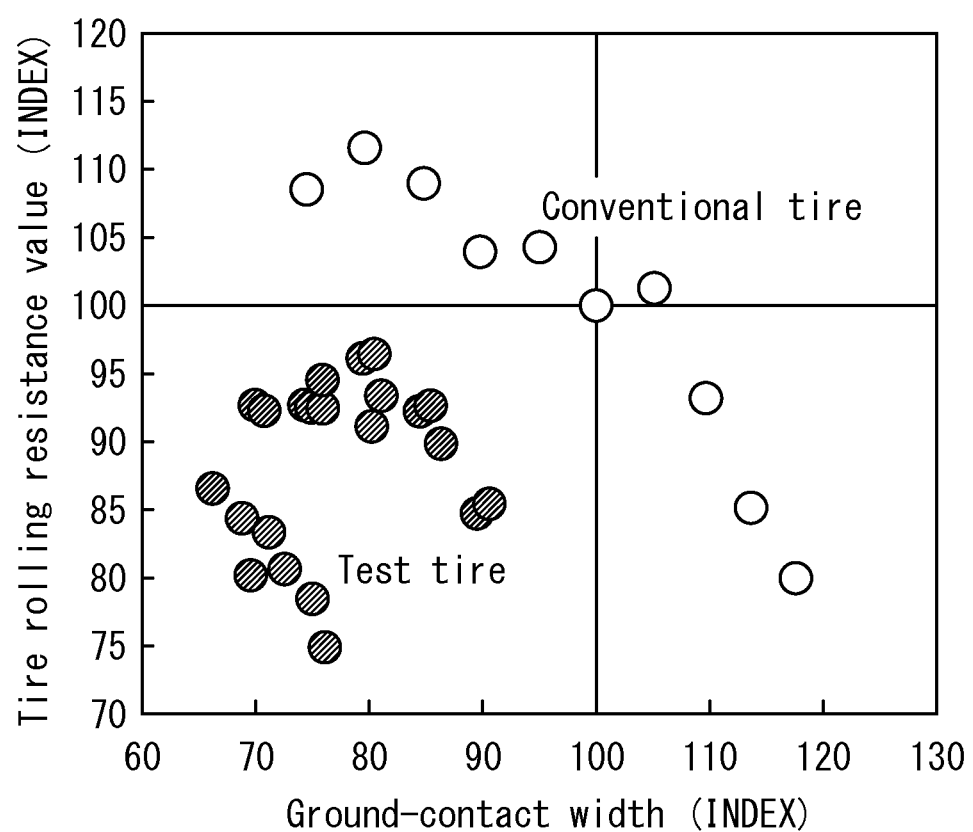
FIG. 13 is a graph illustrating a relationship between a ground-contact width and the rolling resistance value of each tire.

As can be seen in Table 3 and FIG. 13, accordingly, when a tire, which is in size with the tire cross-sectional width SW and the outer diameter OD satisfying SW/OD≤0.26 (SW≤165 (mm)) mounted on a rim with a width corresponding to the bead width of the tire and applied with the maximum load defined for each vehicle wearing the tire, is used to have the ground-contact width of no more than 150 mm, the reduction in both the tire rolling resistance value and the tire weight may be achieved. It can also be seen that, when a tire, which is in size satisfying OD≥2.135×SW+282.3 (SW≥165 (mm)) mounted on the rim with the width corresponding to the bead width of the tire and applied with the maximum load defined for each vehicle wearing the tire, is used to have the ground-contact width of no more than 175 mm, the reduction in both the tire rolling resistance value and the tire weight may be achieved.

Alternatively, when a tire, which is in size satisfying $OD \geq -0.0187 \times SW^2 + 9.15 \times SW - 380$ mounted on the rim with the width corresponding to the bead width of the tire and applied with the maximum load defined for each vehicle wearing the tire, is used to have the ground-contact width of no more than 175 mm, the reduction in both the tire rolling resistance value and the tire weight may be achieved. Note that, in FIG. 13, INDEX 100 means a tire with the ground-contact width of 150 mm. The smaller the number, the smaller the ground-contact width.

The ground-contact width, from a viewpoint of enhancing the safety and stability of the vehicle by securing a tire axial force, is preferably no less than 90 mm.

At this time, the ground-contact length is preferably 90 to 140 mm.

Upon application of a maximum load defined for each vehicle wearing a tire in size with the tire cross-sectional width SW and the outer diameter OD satisfying SW/OD≤0.26 (SW<165 (mm)) and, simultaneously, OD≥2.135×SW+282.3 when taking a linear expression boundary, or $OD \geq -0.0187 \times SW^2 + 9.15 \times SW - 380$ when taking a quadratic boundary, a ground-contact area of the tire is preferably no more than 16000 mm². Thereby, reduction in both the tire rolling resistance and the tire weight may be achieved.

Note that, from the viewpoint of enhancing the safety and stability of the vehicle by securing the tire axial force, the ground-contact area is preferably no less than 10000 mm².

In order to see an effect of the high internal pressure, tires in further various sizes applied with different internal pressure were used for evaluation of the tire rolling resistance and the tire weight.

Figure 15:
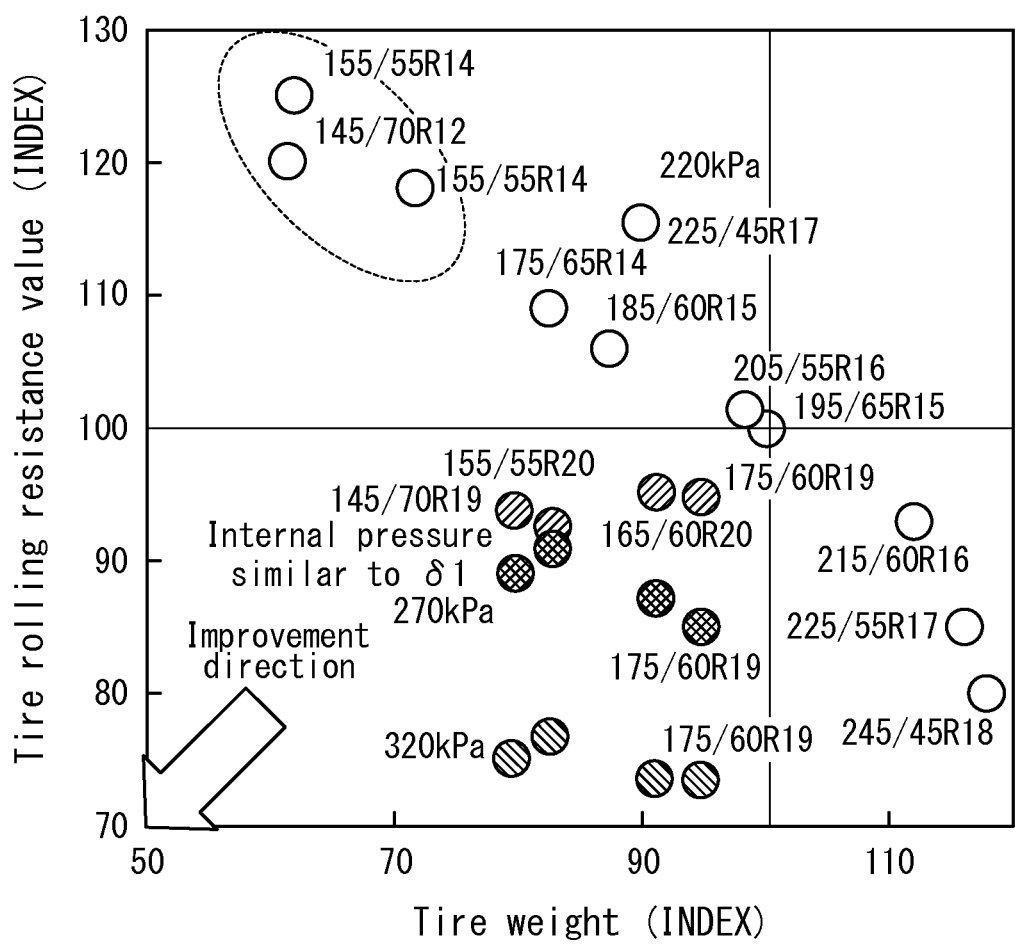
FIG. 15 is a graph illustrating the weight and the rolling resistance value of each tire.

Specifications of each of the tires and results of the evaluation are shown in Table 5 and FIG. 15.

TABLE 5

| | Tire Size | Internal Pressure (kPa) | RR Value (Index) | Tire Weight (Index) |
|---|---|---|---|---|
| Conventional Tire | 145/70R12 | 220 | 120 | 45 |
| | 155/55R14 | 220 | 125 | 49 |
| | 165/60R14 | 220 | 118 | 61 |
| | 175/65R14 | 220 | 109 | 74 |
| | 185/60R15 | 220 | 106 | 83 |
| | 195/65R15 | 220 | 100 | 100 |
| | 205/55R16 | 220 | 101 | 101 |
| | 215/55R17 | 220 | 93 | 121 |
| | 225/55R17 | 220 | 85 | 131 |
| | 245/45R18 | 220 | 80 | 136 |
| | 225/45R17 | 220 | 90 | 116.5 |
| Internal Pressure Similar to Deflection Amount δ1 | 145/70R19 | 265 | 92.5 | 79 |
| | 155/55R20 | 256 | 93.8 | 75 |
| | 165/60R20 | 250 | 95.1 | 93 |
| | 175/60R19 | 250 | 93.2 | 92 |
| High Internal Pressure (Case 1) | 145/70R19 | 270 | 90.7 | 79 |
| | 155/55R20 | 270 | 88.9 | 75 |
| | 165/60R20 | 270 | 87 | 93 |
| | 175/60R19 | 270 | 85.5 | 92 |
| High Internal Pressure (Case 2) | 145/70R19 | 320 | 76.6 | 79 |
| | 155/55R20 | 320 | 75 | 75 |
| | 165/60R20 | 320 | 73.4 | 93 |
| | 175/60R19 | 320 | 72.9 | 92 |

As shown in Table 5 and FIG. 15, by using a tire, which is in size satisfying, under a condition with high internal pressure that allows the δ1 to be similar regardless of the reduction in the ground-contact width, SW/OD≤0.26 (SW<165 (mm)) and, simultaneously, OD≥2.135×SW+282.3 (SW≥162 (mm)) (it may also be referred to as a relational expression A) when taking the linear expression boundary, or OD≥−0.0187×SW²+9.15×SW−380 (it may also be referred to as a relational expression B) when taking the quadratic boundary, both the tire rolling resistance and the tire weight may be reduced.

It can also be seen that, by using the tire in size satisfying the relational expression A or the relational expression B described above applied with the internal pressure of no less than 270 kPa, the tire rolling resistance may be significantly reduced and, with the internal pressure of no less than 320 kPa, the tire rolling resistance may be even further reduced.

Here, a preferable tire structure for use with high internal pressure of no less than 250 kPa will be described.

First, the carcass preferably has at least one carcass ply having an end in a high turn-up structure positioning outside a tire maximum width portion in a tire radial direction. More preferably, the end portion has what is called an envelope structure positioning between the carcass and a belt in the tire radial direction.

As for the belt, one with high rigidity is preferably used. More specifically, a belt cord with Young's modulus of 45000 MPa or higher is preferably used.

Thereby, the carcass structure and the rigidity of the belt are optimized, ensuring a tire durable with high internal pressure.

Further, an inner liner of the tire preferably has a thickness of no less than 0.6 mm, so as to prevent air leak under a high internal pressure condition.

Here, the inventors have also found these problems specific to a tire with a small width, a large diameter and high internal pressure that the tire with a smaller width as described above has a smaller deflection amount on the ground-contact area, that a belt tension is increased due to the large radial and high internal pressure which increases a vertical spring coefficient, and that the comfortability is degraded. As such, the inventors have diligently studied to solve those problems and acquired a knowledge of a tire structure that may solve the problems.

The following is a description of a structure of a pneumatic radial tire with a small width, a large diameter and high internal pressure for a passenger vehicle that improves the comfortability.

Figure 16:
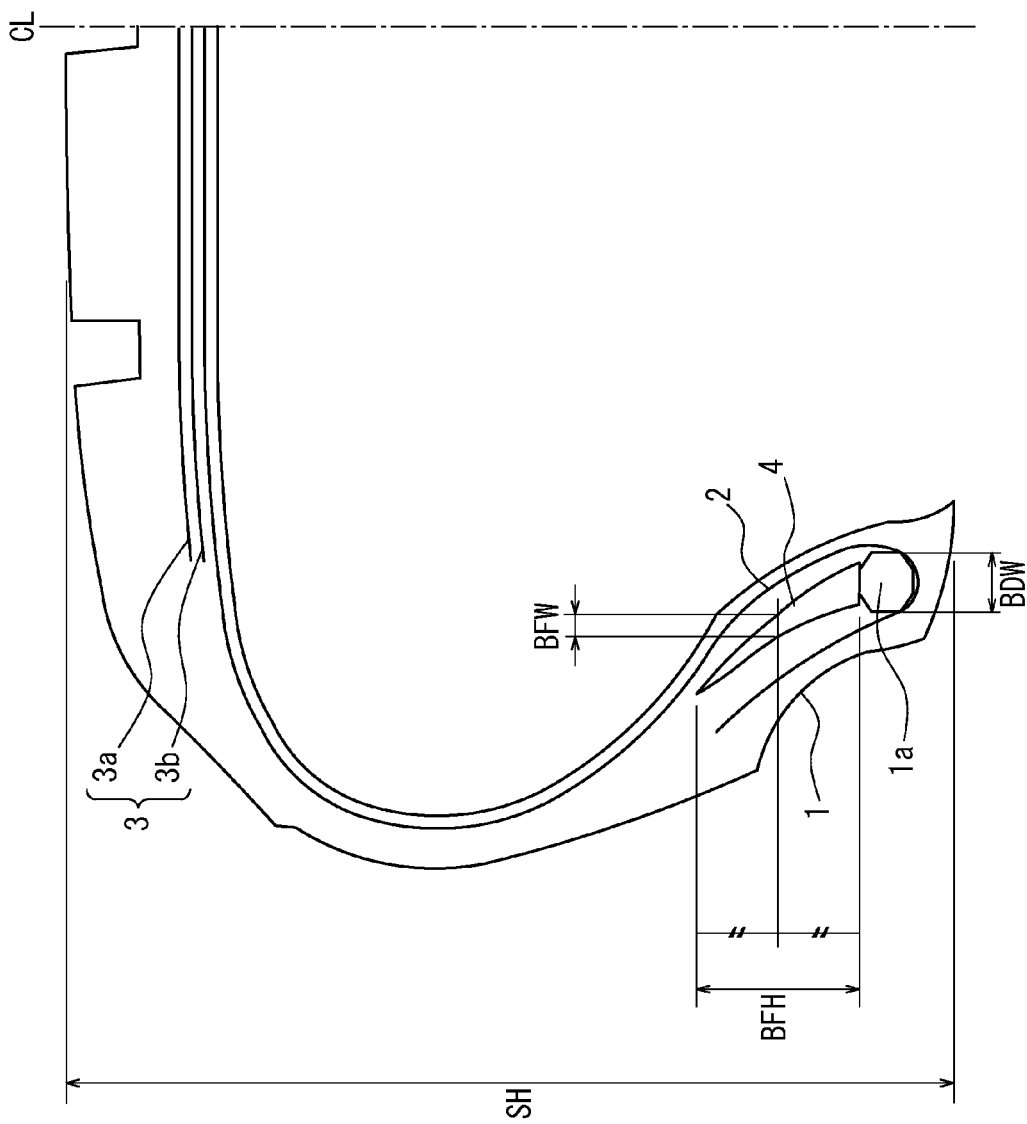
FIG. 16 is a cross-sectional view in a tire width direction of a pneumatic radial tire for a passenger vehicle according to the present invention.

FIG. 16 is cross-sectional view of a tire in the tire width direction according to a first embodiment of the present invention.

FIG. 16 illustrates a half portion of the tire in the tire width direction from a tire equatorial plane CL serving as a boundary.

Note that this tire is in size satisfying the relational expression A or the relational expression B.

As illustrated in FIG. 16, the tire according to the present embodiment includes a belt 3, which is made up of two belt layers 3a, 3b by way of example in the figure at a position radially outside the carcass 2 that is composed of a ply of carcass cords radially arranged and toroidally provided around the bead core 1a embedded in a pair of bead portions 1 of the tire, and a bead filler 4 disposed at a position radially outside the bead core 1a.

Here, the bead filler 4 is a high-rigidity member having 100% modulus at room temperature at, for example, 24 to 31 (MPa) in conformity to JIS K6251 (revised on Dec. 20, 2010).

Here, in the tire of the present embodiment, a tire-width-direction cross-sectional area S1 of the bead filler 4 is 1 to 4 times the size of a tire-width-direction cross-sectional area S2 of the bead core 1a.

Note that, when the tire has a holding bead core structure in which the carcass is held from both inner side and outer side in the tire width direction, a total volume of the bead core inside and outside the carcass in the tire width direction is defined as S2.

The following is a description of an operation and an effect of the present embodiment.

The cross-section of the bead filler 4 within an above-mentioned range enables reduction in the volume of the bead filler, which is the high-rigidity member, and also in the vertical spring coefficient of the tire, thereby improving the comfortability. The tire weight may be reduced also by reducing weight of the bead filler, whereby the tire rolling resistance may be further reduced.

Especially, since the tire with a small width and a large diameter satisfying the relational expression A or the relational expression B has high tension rigidity of the belt and low tension rigidity in the tire side portion compared to that of the belt, limiting the cross-sectional area S1 of the bead filler within the predetermined range as described above is highly effective in reduction of the vertical spring coefficient.

Here, when the tire-width-direction cross-sectional area S1 of the bead filler 4 is larger than 4 times the size of the tire-width-direction cross-sectional area S2 of the bead core 1, the volume of the bead filler made of the high-rigidity member increases, suppressing sufficient reduction in the vertical spring coefficient of the tire and degrading the comfortability.

On the other hand, when the tire-width-direction cross-sectional area S1 of the bead filler 4 is smaller than the tire-width-direction cross-sectional area S2 of the bead core 1a, the rigidity of the bead portion is significantly reduced and a lateral spring coefficient becomes too small to ensure steering stability.

According to the present embodiment, also, as illustrated in FIG. 16, when BFW represents a width of the bead filler 4 in the tire width direction in a tire radial direction center position and BDW represents a maximum width of the bead core 1a in the tire width direction, $$0.1 \leq BFW/BDW \leq 0.5$$

is preferably satisfied.

This is because, when the ratio BFW/BDW is no more than 0.5, the volume of the bead filler may be reduced while a height thereof is maintained, which enables the reduction in the vertical spring coefficient while maintaining the rigidity in the tire rotational direction. Accordingly, the comfortability may be improved and the tire weight may be reduced.

Also, when the ratio BFW/BDW is no less than 1.0, the rigidity of the bead portion may be ensured and the vertical spring coefficient may be maintained, thereby further ensuring the steering stability.

According to the present embodiment, further, as illustrated in FIG. 16, when BFH represents a height of the bead filler 4 in the tire radial direction and SH represents a sectional height of the tire (tire cross-sectional height), $$0.1 \leq BFH/SH \leq 0.25$$

is preferably satisfied.

This is because, when the above ratio BFH/SH is no more than 0.25, the height of the bead filler, which is made of the high-rigidity member, in the radial direction may be reduced, whereby the vertical spring coefficient of the tire may be effectively reduced and the comfortability may be improved.

Also, when the above ratio BFH/SH is no less than 0.1, the rigidity of the bead portion is ensured and the lateral spring coefficient may be maintained, thereby further ensuring the steering stability.

More specifically, the BFH representing the height of the bead filler in the tire radial direction is preferably 10 mm to 45 mm.

Here, the tire sectional height SH represents a ½ of a difference between an outer diameter of the tire and a diameter of the rim when the tire is mounted on the rim and applied with the internal pressure defined for each vehicle wearing the tire and no load.

Figure 17:
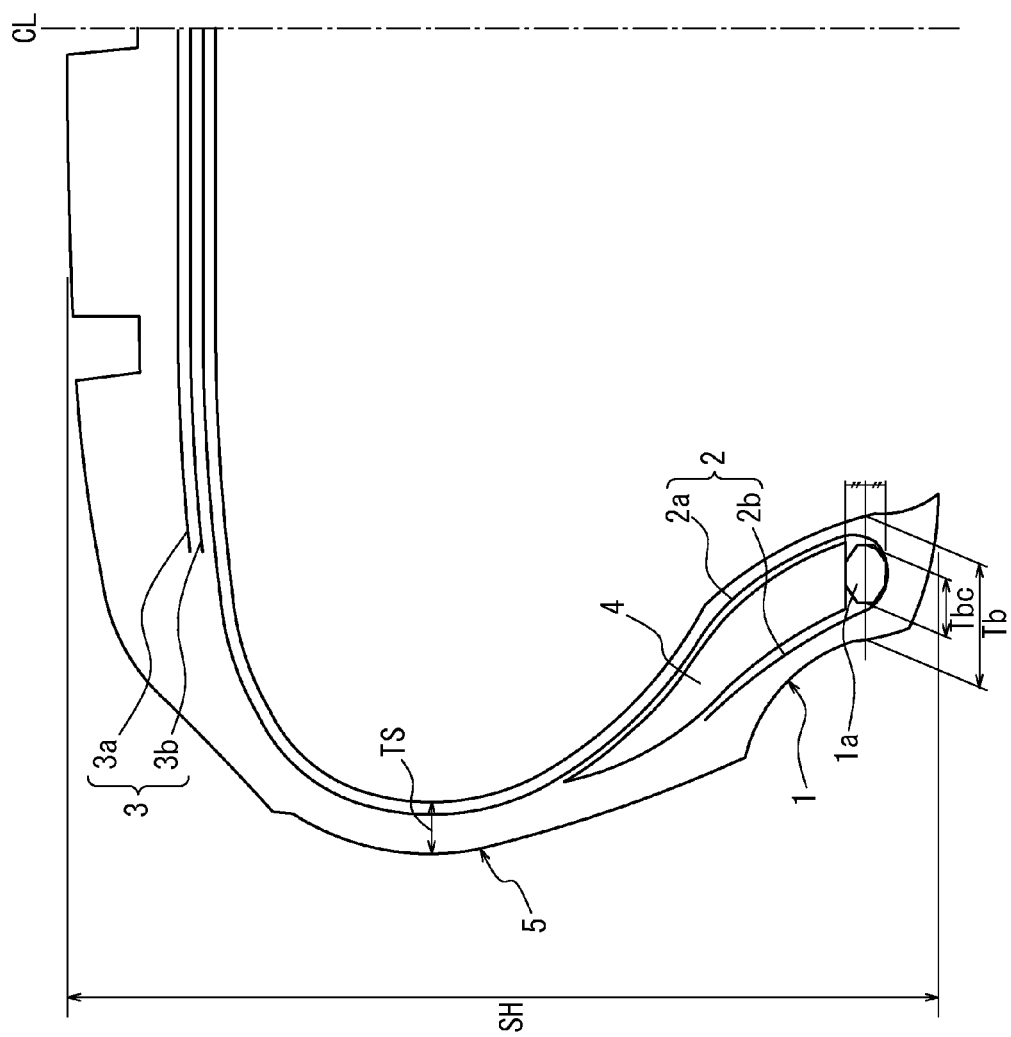
FIG. 17 is a cross-sectional view in a tire width direction of a pneumatic radial tire for a passenger vehicle according to the present invention.

FIG. 17 is a cross-sectional view of a tire in the tire width direction according to a second embodiment of the present invention.

FIG. 17 illustrates a half portion of the tire in the tire width direction from the tire equatorial plane CL serving as the boundary.

Note that this tire is in size satisfying the relational expression A or the relational expression B.

As illustrated in FIG. 17, the tire according to the present embodiment includes a belt 3, which is made up of two belt layers 3a, 3b by way of example in the figure at a position radially outside the carcass 2 that is composed of a ply of carcass cords radially disposed and toroidally provided around the bead core 1a embedded in the pair of bead portions 1 of the tire.

The tire according to the present embodiment also includes a sidewall portion 5 connecting to the beat portion 1.

In the illustrated example, the carcass 2 is made up of a carcass main portion 2a and a folding portion 2b.

In the illustrated example, further, the bead filler 4 is disposed radially outside the bead core 1a in the tire radial direction.

Figure 18A:
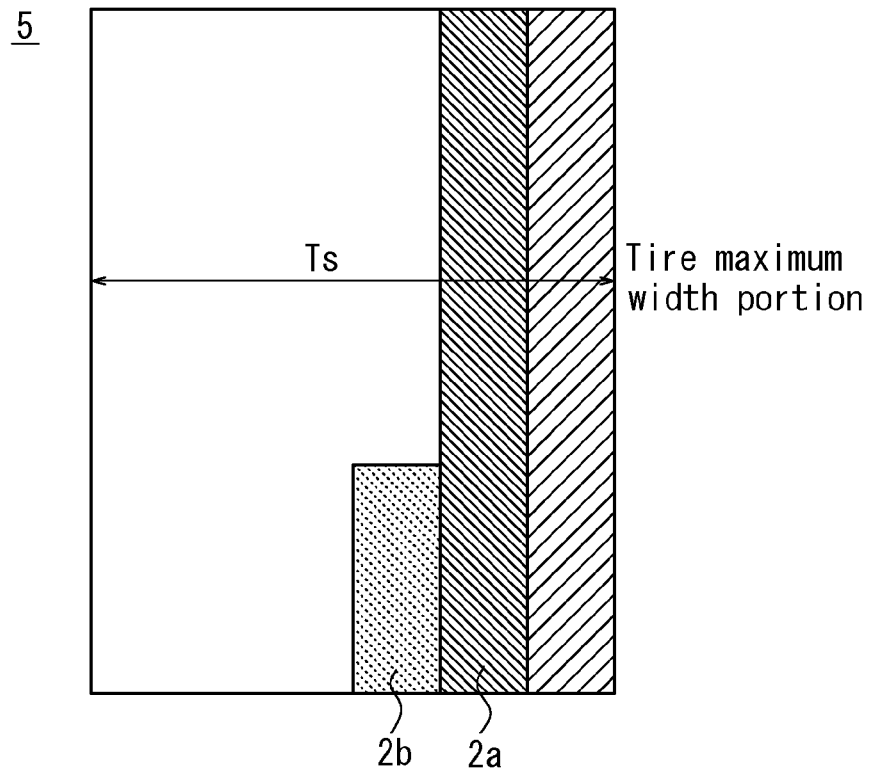
FIG. 18(a) is a schematic diagram illustrating a size of a member around sidewall portion.
Figure 18B:
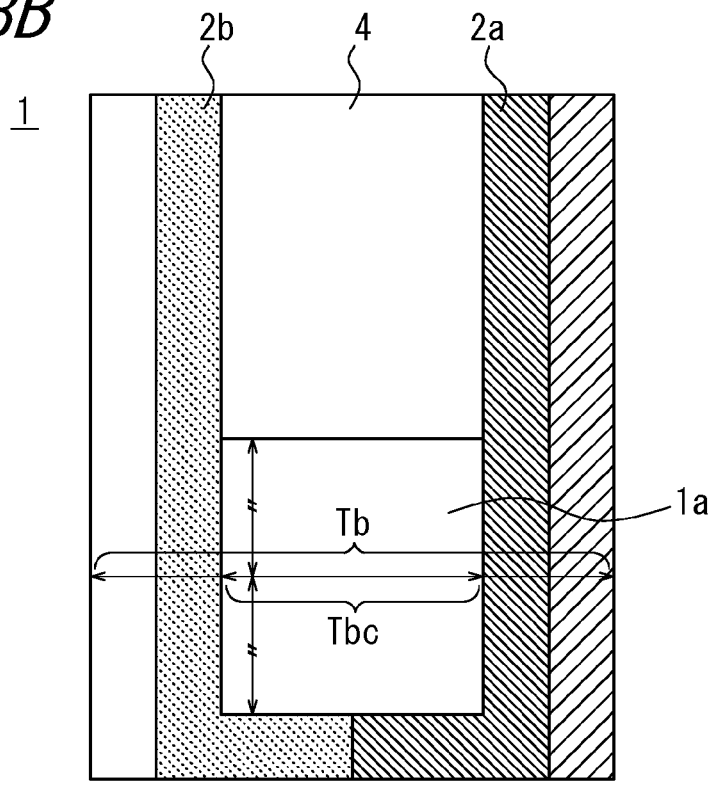
FIG. 18(b) is a schematic diagram illustrating a size of a member around the bead portion.

FIG. 18(a) is a schematic diagram illustrating a size of a tire member around a sidewall portion of the tire. FIG. 18(b) is a schematic diagram illustrating a size of the tire member around the bead portion of the tire.

Here, according to the present embodiment, as illustrated in FIGS. 17 and 18(a), (b), when Ts represents a gauge of the sidewall portion 5 in the tire maximum width portion and Tb represents a bead width in a tire radial direction center position of the bead core 1a, a ratio Ts/Tb is 15% to 40%.

Note that the "tire maximum width portion" means a maximum width position in a tire-width-direction cross-section when the tire is mounted on the rim and applied with no load.

The gauge Ts is a sum of thicknesses of all members including rubber, a reinforcing member, the inner liner and the like.

When the tire has a structure in which the bead core is divided into small bead cores by the carcass, Tb represents a distance between a width direction innermost end and an outermost end among all of the small bead cores.

The following is a description of an operation and an effect of the present embodiment.

According to the present embodiment, when the ratio Ts/Tb is within the above range, the rigidity of the tire maximum width portion where great bending deformation occurs during application of a load on the tire is appropriately reduced, thereby reducing the vertical spring coefficient and improving the comfortability.

That is, when the above ratio Ts/Tb exceeds 40%, the gauge of the sidewall portion 5 in the tire maximum width portion is increased, increasing rigidity of the sidewall portion 5 and the vertical spring coefficient. On the other hand, when the above ratio Ts/Tb is smaller than 15%, the lateral spring coefficient becomes too small to ensure the steering stability.

Here, in particular, the gauge Ts of the sidewall portion in the tire maximum width portion is preferably no less than 1.5 mm.

With the gauge Ts of 1.5 mm or more, the rigidity of the tire maximum width portion may be appropriately maintained, preventing reduction in the lateral spring coefficient and further ensuring the steering stability.

On the other hand, in order to further improve the comfortability by effectively reducing the vertical spring coefficient, the gauge Ts of the sidewall portion 5 in the tire maximum width portion is preferably no more than 4 mm.

Also, a diameter Tbc of the bead core 1a (a maximum width of the bead core in the tire width direction) is preferably 4 mm to 12 mm.

With the Tbc of no less than 4 mm, weight reduction may be achieved while ensuring bending rigidity and torsional rigidity on a rim flange. Also, with the Tbc of no more than 12 mm, the steering stability may be ensured while suppressing weight increase.

Figure 19:
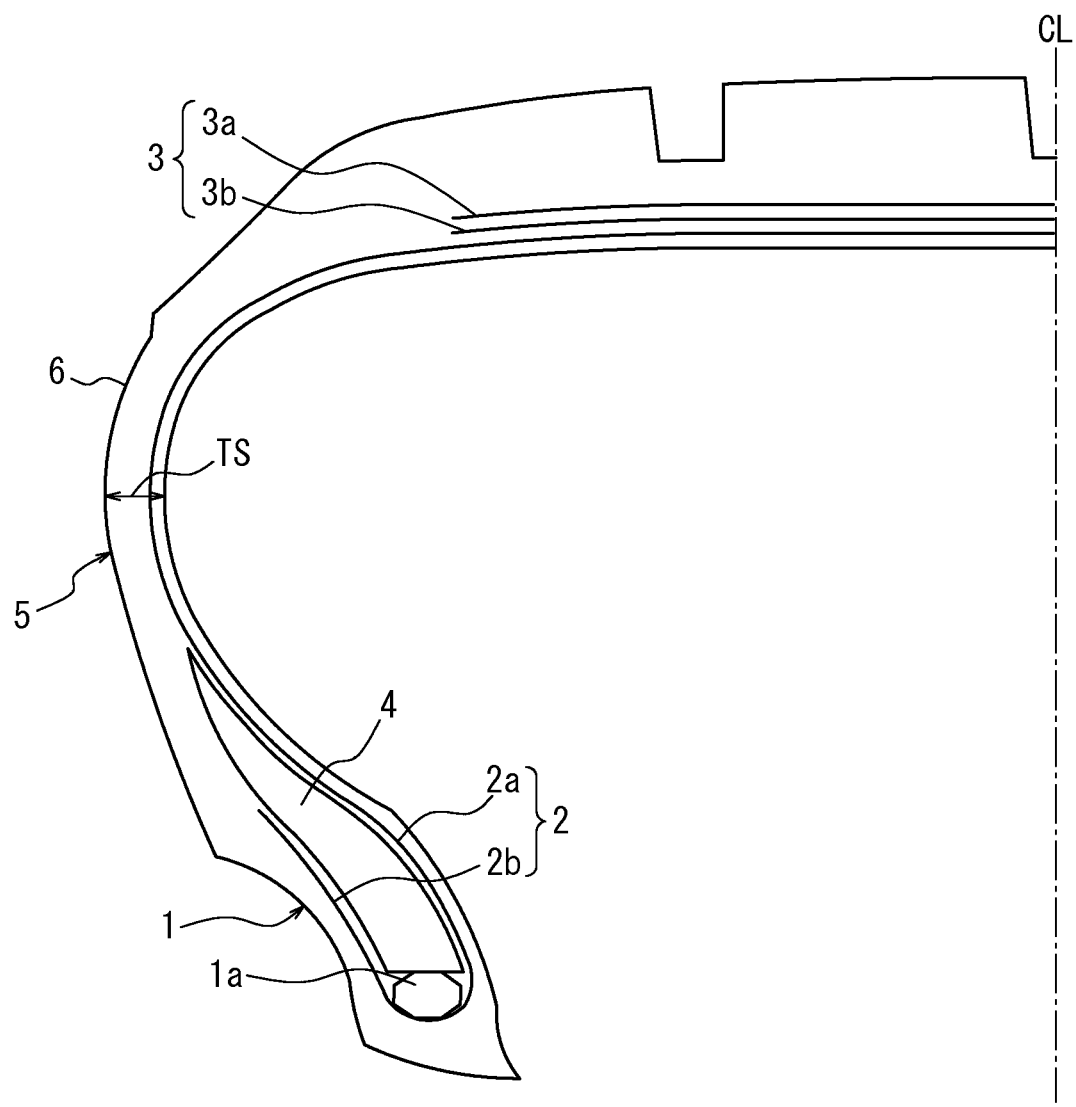
FIG. 19 is a cross-sectional diagram in the tire width direction of the pneumatic radial tire for a passenger vehicle according to the present invention.

FIG. 19 is a cross-sectional view of a tire in the tire width direction according to a third embodiment of the present invention.

FIG. 19 illustrates a half portion of the tire in the tire width direction from the tire equatorial plane CL serving as the boundary.

Note that this tire is in size satisfying the relational expression A or the relational expression B described above.

As illustrated in FIG. 19, the tire according to the present embodiment includes the belt 3, which is made up of two belt layers 3a, 3b by way of example in the figure at a position radially outside the carcass 2 that is composed of a ply of carcass cords radially arranged and toroidally provided in a pair of bead portions 1 of the tire.

The tire of the present embodiment also includes the sidewall portion 5 connecting to the bead portion 1.

In the illustrated example, the bead core 1a is embedded in the bead portion 1, and the bead filler 4 is disposed outside the bead core 1a in the tire radial direction.

Further, in the illustrated example, the carcass 2 is made up of the carcass main portion 2a and the folding portion 2b.

Figure 20:
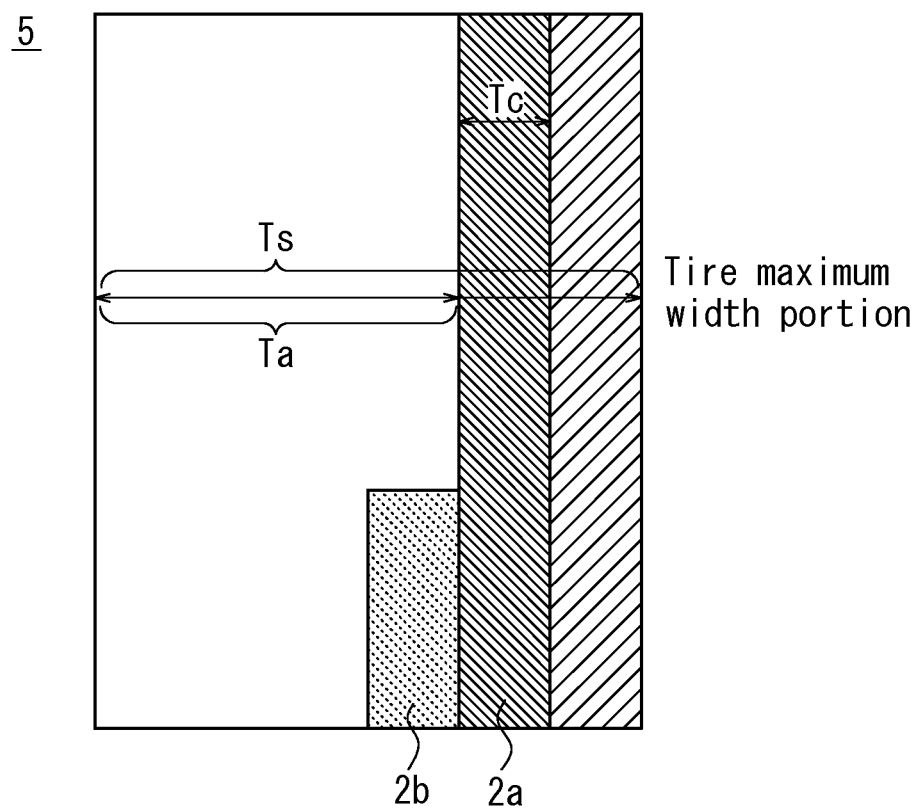
FIG. 20 is a schematic diagram illustrating a size of a tire member around the sidewall portion.

FIG. 20 is a schematic diagram illustrating dimensions of the tire member around the sidewall portion of the tire.

Here, in the tire according to the present embodiment, as illustrated in FIG. 19 and FIG. 20, the ratio Ts/Tc is 5 to 10, the Ts representing the gauge of the sidewall portion 5 in the tire maximum width portion and the Tc representing a diameter of the carcass cord.

Note that the "tire maximum width portion" means the maximum width position in the tire-width-direction cross-section when the tire is mounted on the rim and applied with no load.

The following is a description of an operation and an effect of the present embodiment.

According to the present embodiment, when the ratio Ts/Tc is within the above range, the rigidity of the tire maximum width portion where great bending deformation occurs during application of a load on the tire is appropriately reduced, thereby reducing the vertical spring coefficient and improving the comfortability.

That is, when the ratio Ts/Tc exceeds 10, the gauge of the sidewall portion 4 in the tire maximum width portion is increased, increasing rigidity of the sidewall portion 4 and the vertical spring coefficient. On the other hand, when the ratio Ts/Tc is smaller than 5, the lateral spring coefficient becomes too small to ensure steering stability.

Also, in the tire of the present embodiment, as illustrated in FIG. 19 and FIG. 20, when Ta represents a distance in the tire width direction from a surface of the carcass cord in the tire maximum width portion to a tire outer surface 6, a ratio Ta/Tc is preferably 3 to 6.

With the ratio Ta/Tc of no more than 6, the gauge of the sidewall portion 4 in the tire maximum width portion may be reduced and the rigidity of the sidewall portion 5 may be reduced, thereby reducing the vertical spring coefficient and further improving the comfortability. Also, with the ratio Ta/Tc of no less than 3, the lateral spring coefficient may be ensured, further ensuring the steering stability.

Note that the term "Ta" represents a distance in the tire maximum width portion from the surface of the carcass cord on the width direction outermost side to the tire outer surface.

That is, when the carcass folding portion extends to a radially outer side over the tire maximum width portion, the Ta represents a distance from the surface of the carcass cord in the carcass folding portion to the tire outer surface 6.

Here, the diameter Tc of the carcass cord is preferably 0.4 mm to 0.8 mm. With the diameter Tc of the carcass cord of no more than 0.8 mm, the gauge Ts of the sidewall portion relative to the diameter Tc may be reduced, reducing the vertical spring coefficient. Also, with the diameter Tc of the carcass cord of no less than 0.4 mm, the gauge Ts of the sidewall portion relative to the diameter Tc may be ensured, increasing the lateral spring coefficient and ensuring the steering stability.

EXAMPLES

Example 1

In order to confirm the effect of the tire according to the first embodiment, test tires 34-59 and tires according to Comparative Examples 1 to 10 were produced experimentally. Each of the tires includes a carcass, which is composed of a ply of cords radially arranged and toroidally provided between a pair of bead cores, and a bead filler disposed outside the bead core in the tire radial direction.

The following tests were conducted to evaluate performance of the tires.

<Spring Coefficient>

Each of the tires were mounted on the rim and, by using the indoor tester, the deflection amount thereof was measured. The vertical spring coefficient and the lateral spring coefficient were measured from a tangential gradient of a load of 4 kN and are shown as indices relative to those of the tire according to Comparative Example 1 set to 100. The greater the number, the higher the spring constant. Note that the vertical spring coefficient is used as an index of comfortability; the smaller the number, the better the comfortability.

<Rolling Resistance Value (RR Value)>

Each of the above tires was mounted on the rim to obtain a tire-rim assembly, which was then applied with a maximum load defined for each vehicle wearing the tire, for measurement of the rolling resistance thereof under a condition of a drum rotation speed at 100 km/h.

Results of the evaluation are shown as indices relative to the RR value of the tire according to Comparative Example 1 set to 100. The smaller the index, the smaller the rolling resistance.

<Cornering Power>

By using a flat-belt-type cornering test machine, the cornering power was measured with the load at 4 kN and at a speed of 100 km/h.

For evaluation, the cornering power (CP) is shown as an index relative to that of the tire according to Comparative Example 1 set to 100. The greater the index, the preferably higher the cornering power.

<Tire Weight>

The weight of the tires was measured. For evaluation, the weight is shown as an index relative to that of the tire according to Comparative Example 1 set to 100. The smaller the index, the lighter the weight.

Figure 21A:
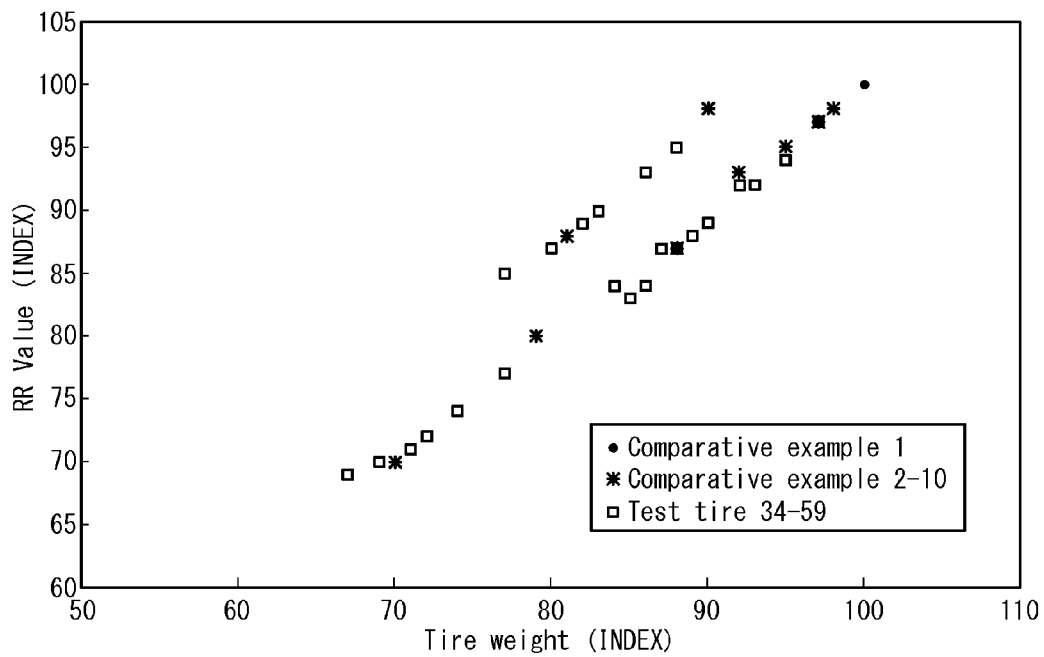
FIGS. 21(a), (b) are graphs illustrating results of an evaluation of a tire performance test.

Specifications of each of the tires are shown in Table 6, and results of the evaluation are shown in Table 7 and FIGS. 21(a), (b).

TABLE 6

| | Tire Size | Internal Pressure (kPa) | S1/S2 | SH (mm) | BFH/SH | BFH (mm) | BFW/BDW |
|---|---|---|---|---|---|---|---|
| Comparative Example 1 | 195/65R15 | 220 | 4.4 | 126.8 | 0.32 | 41 | 0.5 |
| Comparative Example 2 | 195/65R15 | 220 | 4.4 | 126.8 | 0.32 | 41 | 0.3 |
| Comparative Example 3 | 195/65R15 | 220 | 2.1 | 126.8 | 0.15 | 19 | 0.5 |

TABLE 6-continued

|  | Tire Size | Internal Pressure (kPa) | S1/S2 | SH (mm) | BFH/SH | BFH (mm) | BFW/BDW |
|---|---|---|---|---|---|---|---|
| Comparative Example 4 | 195/65R15 | 220 | 1.5 | 126.8 | 0.15 | 19 | 0.3 |
| Test Tire 34 | 165/65R19 | 220 | 4.1 | 107.3 | 0.32 | 34 | 0.5 |
| Test Tire 35 | 165/65R19 | 220 | 2.9 | 107.3 | 0.32 | 34 | 0.3 |
| Test Tire 36 | 165/65R19 | 220 | 1.9 | 107.3 | 0.15 | 16 | 0.5 |
| Test Tire 37 | 165/65R19 | 220 | 1.4 | 107.3 | 0.15 | 16 | 0.3 |
| Test Tire 38 | 155/45R21 | 220 | 2.7 | 69.8 | 0.32 | 22 | 0.5 |
| Test Tire 39 | 155/45R21 | 220 | 1.9 | 69.8 | 0.32 | 22 | 0.3 |
| Test Tire 40 | 155/45R21 | 220 | 1.4 | 69.8 | 0.15 | 10 | 0.5 |
| Test Tire 41 | 155/45R21 | 220 | 1.1 | 69.8 | 0.15 | 10 | 0.3 |
| Test Tire 42 | 165/55R20 | 220 | 3.5 | 90.8 | 0.32 | 29 | 0.5 |
| Test Tire 43 | 165/55R20 | 220 | 2.4 | 90.8 | 0.32 | 29 | 0.3 |
| Test Tire 44 | 165/55R20 | 220 | 1.6 | 90.8 | 0.15 | 14 | 0.5 |
| Test Tire 45 | 165/55R20 | 220 | 1.2 | 90.8 | 0.15 | 14 | 0.3 |
| Test Tire 46 | 165/65R19 | 220 | 1 | 107.3 | 0.19 | 20 | 0.3 |
| Test Tire 47 | 165/65R19 | 220 | 4 | 107.3 | 0.33 | 35 | 0.3 |
| Comparative Example 5 | 165/65R19 | 220 | 0.9 | 107.3 | 0.19 | 20 | 0.3 |
| Comparative Example 6 | 165/65R19 | 220 | 4.1 | 107.3 | 0.33 | 35 | 0.3 |
| Test Tire 48 | 155/45R21 | 220 | 1 | 69.8 | 0.32 | 22 | 0.3 |
| Test Tire 49 | 155/45R21 | 220 | 4 | 69.8 | 0.34 | 24 | 0.3 |
| Comparative Example 7 | 155/145R21 | 220 | 0.9 | 69.8 | 0.32 | 22 | 0.3 |
| Comparative Example 8 | 155/45R21 | 220 | 4.1 | 69.8 | 0.34 | 24 | 0.3 |
| Test Tire 50 | 165/55R20 | 220 | 1 | 90.8 | 0.2 | 18 | 0.3 |
| Test Tire 51 | 165/55R20 | 220 | 4 | 90.8 | 0.33 | 30 | 0.3 |
| Comparative Example 9 | 165/55R20 | 220 | 0.9 | 90.8 | 0.2 | 18 | 0.3 |
| Comparative Example 10 | 165/55R20 | 220 | 4.1 | 90.8 | 0.33 | 30 | 0.3 |
| Test Tire 52 | 165/65R19 | 220 | 2.9 | 107.3 | 0.32 | 34 | 0.1 |
| Test Tire 53 | 165/65R19 | 220 | 2.9 | 107.3 | 0.32 | 34 | 0.5 |
| Test Tire 54 | 165/65R19 | 220 | 2.9 | 107.3 | 0.32 | 34 | 0.09 |
| Test Tire 55 | 165/65R19 | 220 | 2.9 | 107.3 | 0.32 | 34 | 0.51 |
| Test Tire 56 | 165/65R19 | 220 | 1.5 | 107.3 | 0.1 | 11 | 0.3 |
| Test Tire 57 | 165/65R19 | 220 | 1.5 | 107.3 | 0.25 | 27 | 0.3 |
| Test Tire 58 | 165/65R19 | 220 | 1.5 | 107.3 | 0.09 | 10 | 0.3 |
| Test Tire 59 | 165/65R19 | 220 | 1.5 | 107.3 | 0.26 | 28 | 0.3 |

TABLE 7

|  | Vertical Spring Coefficient | Lateral Spring Coefficient | Lateral Spring Coefficient/ Vertical Spring Coefficient | RR Value | CP | Weight | Ground-Contact Length L | Ground-Contact Width W | OD |
|---|---|---|---|---|---|---|---|---|---|
| Comparative Example 1 | 100 | 100 | 100 | 100 | 100 | 100 | 100 | 100 | 100 |
| Comparative Example 2 | 99 | 96 | 97 | 98 | 98 | 98 | 101 | 100 | 100 |
| Comparative Example 3 | 96 | 95 | 99 | 95 | 97 | 95 | 101 | 100 | 100 |
| Comparative Example 4 | 95 | 93 | 98 | 93 | 96 | 92 | 102 | 100 | 100 |
| Test Tire 34 | 97 | 109 | 112 | 92 | 110 | 93 | 103 | 85 | 109.9 |
| Test Tire 35 | 96 | 108 | 113 | 89 | 108 | 90 | 104 | 85 | 109.9 |
| Test Tire 36 | 95 | 107 | 113 | 87 | 105 | 87 | 103 | 85 | 109.9 |
| Test Tire 37 | 93 | 105 | 113 | 84 | 105 | 84 | 104 | 85 | 109.9 |
| Test Tire 38 | 97 | 111 | 114 | 74 | 103 | 74 | 103 | 80 | 106.1 |
| Test Tire 39 | 95 | 110 | 116 | 72 | 103 | 72 | 104 | 80 | 106.1 |
| Test Tire 40 | 94 | 108 | 115 | 70 | 102 | 69 | 104 | 80 | 106.1 |
| Test Tire 41 | 92 | 106 | 115 | 69 | 102 | 67 | 105 | 80 | 106.1 |
| Test Tire 42 | 97 | 112 | 115 | 93 | 113 | 86 | 104 | 86 | 108.7 |
| Test Tire 43 | 96 | 110 | 115 | 90 | 114 | 83 | 105 | 86 | 108.7 |
| Test Tire 44 | 95 | 106 | 112 | 87 | 108 | 80 | 104 | 86 | 108.7 |
| Test Tire 45 | 93 | 104 | 112 | 85 | 108 | 77 | 105 | 86 | 108.7 |
| Test Tire 46 | 95 | 105 | 111 | 88 | 106 | 89 | 103 | 85 | 109.9 |
| Test Tire 47 | 99 | 112 | 113 | 94 | 115 | 95 | 103 | 85 | 109.9 |
| Comparative Example 5 | 93 | 98 | 105 | 87 | 99 | 88 | 103 | 85 | 109.9 |

TABLE 7-continued

| | Vertical Spring Coefficient | Lateral Spring Coefficient | Lateral Spring Coefficient/ Vertical Spring Coefficient | RR Value | CP | Weight | Ground-Contact Length L | Ground-Contact Width W | OD |
|---|---|---|---|---|---|---|---|---|---|
| Comparative Example 6 | 105 | 115 | 110 | 97 | 116 | 97 | 103 | 85 | 109.9 |
| Test Tire 48 | 94 | 107 | 114 | 71 | 103 | 71 | 104 | 80 | 106.1 |
| Test Tire 49 | 98 | 114 | 116 | 77 | 110 | 77 | 104 | 80 | 106.1 |
| Comparative Example 7 | 92 | 98 | 107 | 70 | 94 | 70 | 104 | 80 | 106.1 |
| Comparative Example 8 | 104 | 117 | 113 | 80 | 111 | 79 | 104 | 80 | 106.1 |
| Test Tire 50 | 95 | 106 | 112 | 89 | 114 | 82 | 105 | 86 | 108.7 |
| Test Tire 51 | 99 | 114 | 115 | 95 | 118 | 88 | 105 | 86 | 108.7 |
| Comparative Example 9 | 93 | 99 | 106 | 88 | 99 | 81 | 105 | 86 | 108.7 |
| Comparative Example 10 | 105 | 117 | 111 | 98 | 122 | 90 | 105 | 86 | 108.7 |
| Test Tire 52 | 95 | 104 | 109 | 88 | 108 | 89 | 104 | 85 | 109.9 |
| Test Tire 53 | 98 | 112 | 114 | 94 | 112 | 95 | 104 | 85 | 109.9 |
| Test Tire 54 | 93 | 97 | 104 | 87 | 106 | 88 | 104 | 85 | 109.9 |
| Test Tire 55 | 99 | 115 | 116 | 97 | 116 | 97 | 104 | 85 | 109.9 |
| Test Tire 56 | 93 | 100 | 108 | 84 | 102 | 86 | 104 | 85 | 109.9 |
| Test Tire 57 | 97 | 110 | 113 | 89 | 105 | 90 | 104 | 85 | 109.9 |
| Test Tire 58 | 90 | 91 | 101 | 83 | 101 | 85 | 104 | 85 | 109.9 |
| Test Tire 59 | 99 | 111 | 112 | 92 | 106 | 92 | 104 | 85 | 109.9 |

Figure 21B:
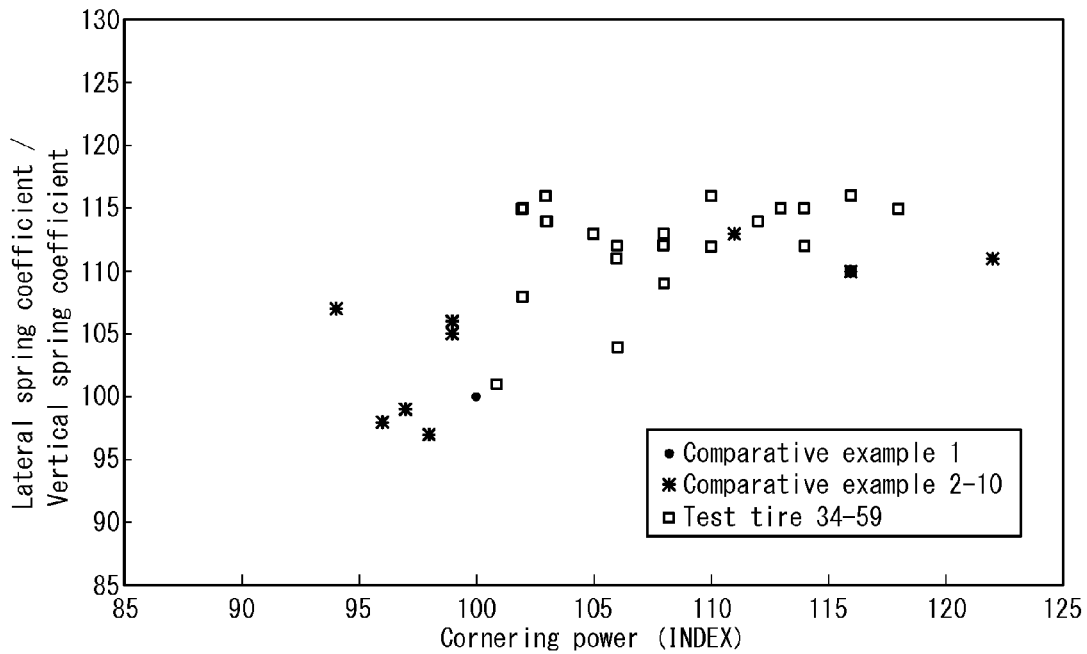

As illustrated in Tables 6, 7 and FIGS. 21 (*a*), (*b*), each of the test tires satisfying the relational expression A or the relational expression B and, simultaneously, having S1/S2 within a favorable range is lightweight and has less rolling resistance as well as a small vertical spring coefficient, thus providing excellent comfortability.

Also, the test tires having the ratio BFW/BDW within the favorable range have smaller vertical spring coefficients while ensuring the cornering power.

Further, the test tires having a favorable ratio BFH/SH may reduce the vertical spring coefficient while ensuring the cornering power.

Next, in order to see the effect of high internal pressure of the tire, tests for evaluation of performance of test tires 60 to 71 and tires according to Comparative Examples 11 to 13 with high internal pressure shown below were conducted.

Figure 22A:
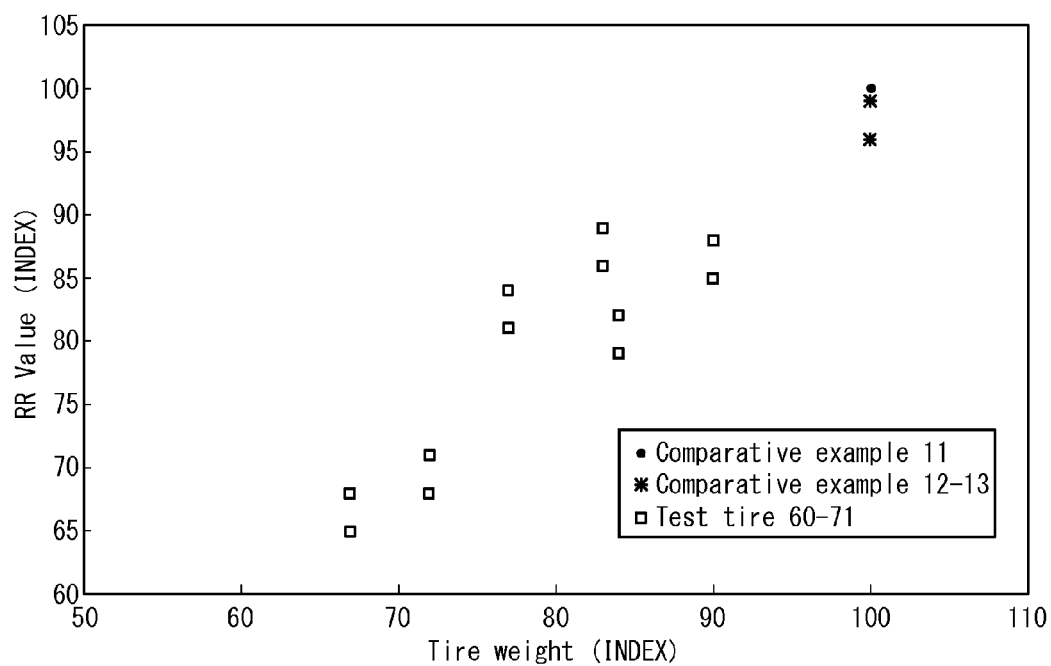
FIGS. 22(a), (b) are graphs illustrating results of an evaluation of a tire performance test.
Figure 22B:
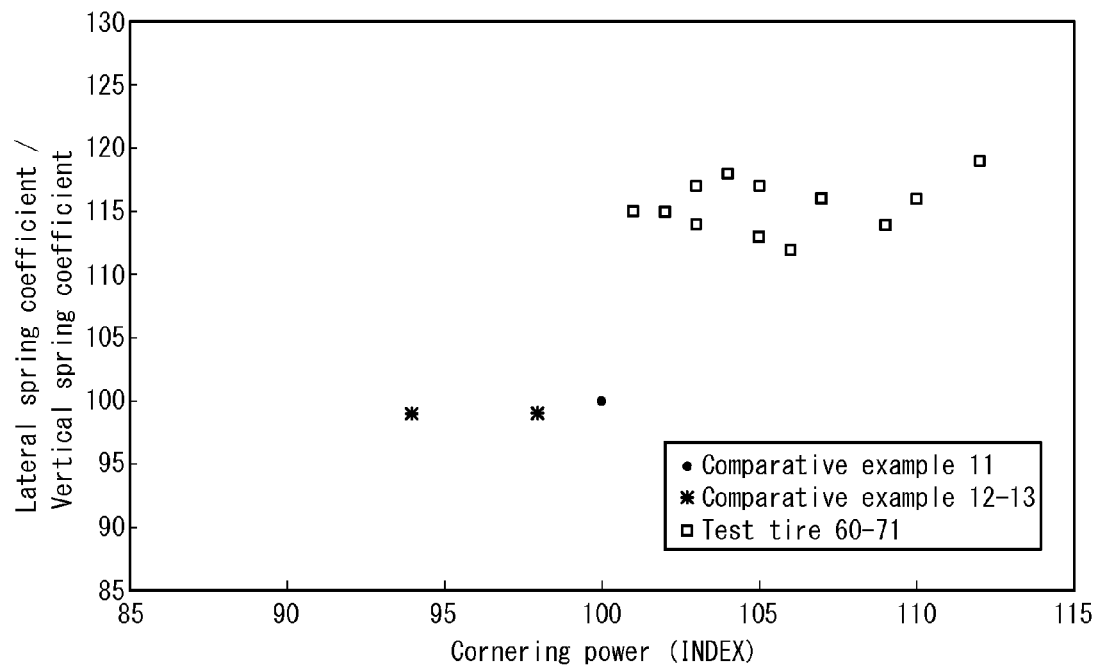

Specifications of each of the tires are shown in Table 8, and results of the evaluation are shown in Table 9 and FIGS. 22(*a*), (*b*).

TABLE 8

| | Tire Size | Internal Pressure (kPa) | S1/S2 | SH (mm) | BFH/SH | BFH (mm) | BFW/BDW |
|---|---|---|---|---|---|---|---|
| Comparative Example 11 | 195/65R15 | 220 | 4.4 | 126.8 | 0.32 | 41 | 0.5 |
| Comparative Example 12 | 195/65R15 | 240 | 4.4 | 126.8 | 0.32 | 41 | 0.5 |
| Comparative Example 13 | 195/65R15 | 250 | 4.4 | 126.8 | 0.32 | 41 | 0.3 |
| Test Tire 60 | 165/65R19 | 240 | 2.9 | 107.3 | 0.32 | 34 | 0.3 |
| Test Tire 61 | 165/65R19 | 250 | 2.9 | 107.3 | 0.32 | 34 | 0.3 |
| Test Tire 62 | 165/65R19 | 240 | 1.4 | 107.3 | 0.15 | 16 | 0.3 |
| Test Tire 63 | 165/65R19 | 250 | 1.4 | 107.3 | 0.15 | 16 | 0.3 |
| Test Tire 64 | 155/45R21 | 240 | 1.9 | 69.8 | 0.32 | 22 | 0.3 |
| Test Tire 65 | 155/45R21 | 250 | 1.9 | 69.8 | 0.32 | 22 | 0.3 |
| Test Tire 66 | 155/45R21 | 240 | 1.1 | 69.8 | 0.15 | 10 | 0.3 |
| Test Tire 67 | 155/45R21 | 250 | 1.1 | 69.8 | 0.15 | 10 | 0.3 |
| Test Tire 68 | 165/55R20 | 240 | 2.4 | 90.8 | 0.32 | 29 | 0.3 |
| Test Tire 69 | 165/55R20 | 250 | 2.4 | 90.8 | 0.32 | 29 | 0.3 |
| Test Tire 70 | 165/55R20 | 240 | 1.2 | 90.8 | 0.15 | 14 | 0.3 |
| Test Tire 71 | 165/55R20 | 250 | 1.2 | 90.8 | 0.15 | 14 | 0.3 |

TABLE 9

| | Lateral Spring Coefficient | Lateral Spring Coefficient | Lateral Spring Coefficient/ Vertical Spring Coefficient | RR Value | CP | Weight | Ground-Contact Length L | Ground-Contact Width W | OD |
|---|---|---|---|---|---|---|---|---|---|
| Comparative Example 11 | 100 | 100 | 100 | 100 | 100 | 100 | 100 | 100 | 100 |
| Comparative Example 12 | 104 | 103 | 99 | 99 | 98 | 100 | 96 | 100 | 100 |
| Comparative Example 13 | 106 | 105 | 99 | 96 | 94 | 100 | 93 | 100 | 100 |
| Test Tire 60 | 97 | 110 | 113 | 88 | 105 | 90 | 102 | 85 | 109.9 |
| Test Tire 61 | 98 | 114 | 116 | 85 | 107 | 90 | 101 | 85 | 109.9 |
| Test Tire 62 | 94 | 107 | 114 | 82 | 103 | 84 | 103 | 85 | 109.9 |
| Test Tire 63 | 95 | 111 | 117 | 79 | 105 | 84 | 102 | 85 | 109.9 |
| Test Tire 64 | 97 | 112 | 115 | 71 | 102 | 72 | 103 | 80 | 106.1 |
| Test Tire 65 | 98 | 116 | 118 | 68 | 104 | 72 | 102 | 80 | 106.1 |
| Test Tire 66 | 94 | 108 | 115 | 68 | 101 | 67 | 103 | 80 | 106.1 |
| Test Tire 67 | 95 | 111 | 117 | 65 | 103 | 67 | 102 | 80 | 106.1 |
| Test Tire 68 | 97 | 113 | 116 | 89 | 110 | 83 | 103 | 86 | 108.7 |
| Test Tire 69 | 98 | 117 | 119 | 86 | 112 | 83 | 102 | 86 | 108.7 |
| Test Tire 70 | 95 | 106 | 112 | 84 | 106 | 77 | 103 | 86 | 108.7 |
| Test Tire 71 | 96 | 109 | 114 | 81 | 109 | 77 | 102 | 86 | 108.7 |

Comparisons between Tables 9 and 7 and between FIGS. 21 (*a*), (*b*) and FIGS. 22(*a*), (*b*) show that use of the tire with high internal pressure further reduces the tire rolling resistance and further improves the cornering power.

Example 2

Next, in order to confirm the effect of the tire according to the second embodiment, test tires 72 to 82 and tires according to Comparative Examples 14 to 23 were produced experimentally. Each of the tires includes the carcass, which is composed of a ply of codes radially arranged and toroidally provided between a pair of bead cores, and a pair of sidewall portions connected to the bead portions.

In order to evaluate the performance of these tires, in a manner similar to Example 1, tests were conducted for evaluation of the spring coefficients, the rolling resistance value (RR value), the cornering power, and the tire weight.

Note that, for evaluation, the spring coefficients are shown as indices relative to that of the tire according to Comparative Example 14 set to 100. The greater the value, the higher the spring constant. Also, the rolling resistance value (RR value), for evaluation thereof, is shown as an index relative to that of the tire according to Comparative Example 14 set to 100. The smaller the index, the smaller the rolling resistance. Further, the cornering power, for evaluation thereof, is shown as an index relative to that of the tire according to Comparative Example 14 set to 100. The greater the index, the preferably higher the cornering power. Also, the tire weight, for evaluation thereof, is shown as an index relative to that of the tire according to Comparative Example 14 set to 100. The smaller the value, the lighter the weight.

Figure 23A:
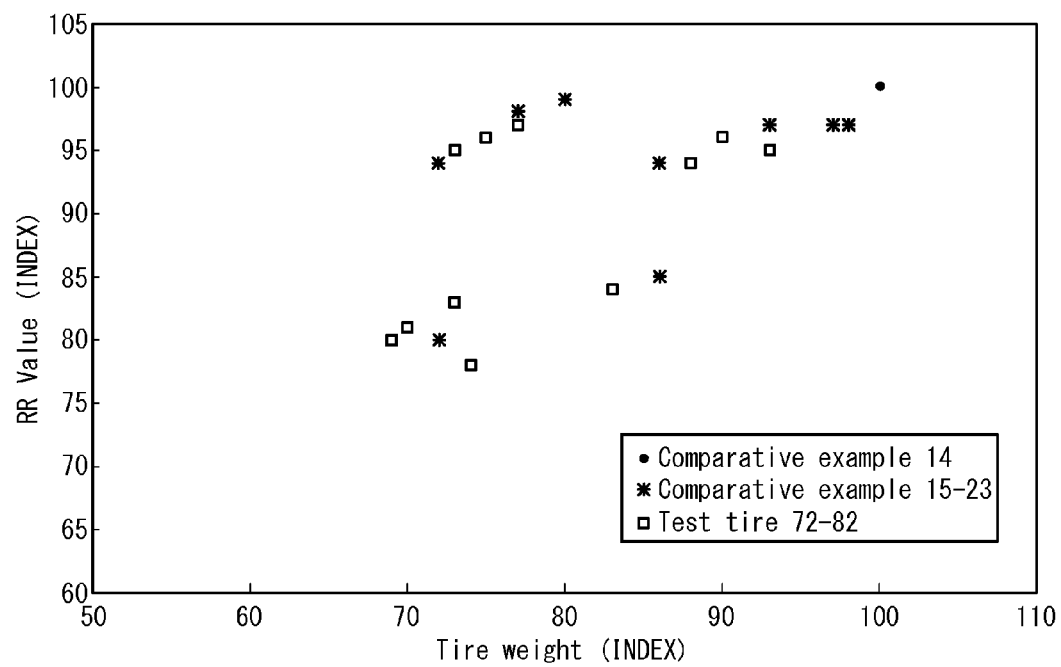
FIGS. 23(a), (b) are graphs illustrating results of an evaluation of a tire performance test.
Figure 23B:
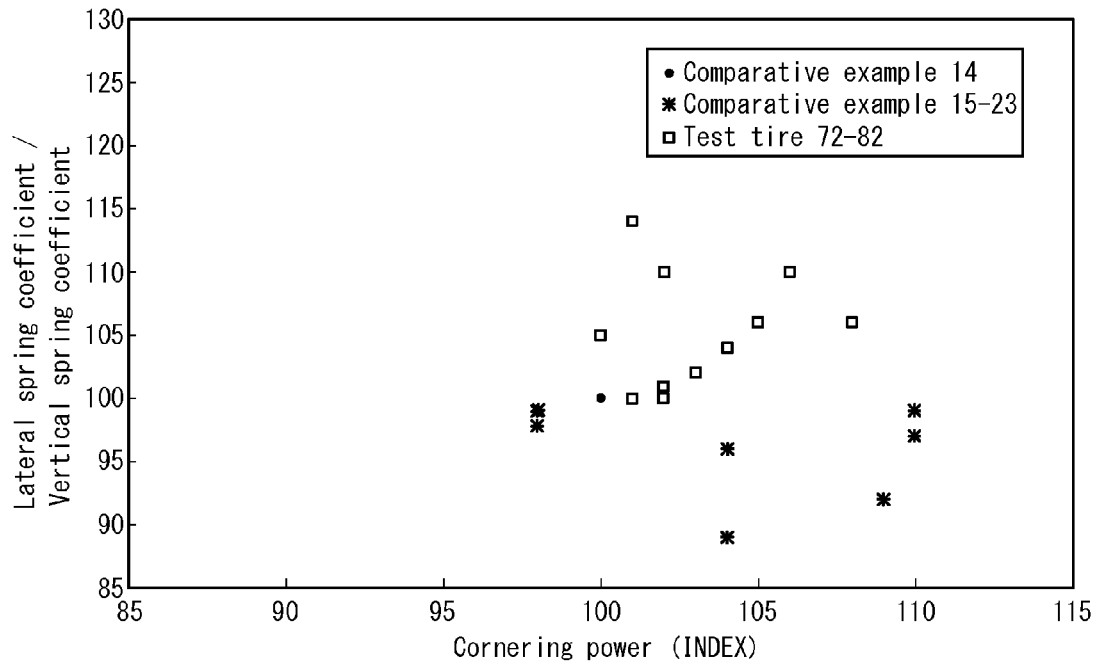

Specifications of each of the tires are shown in Table 10, and results of the evaluation are shown in Table 11 and FIGS. 23(*a*), (*b*).

Note that in Table 10 the term "SH" means a sectional height (a cross-sectional height of the tire).

TABLE 10

| | Tire Size | Ratio SW/OD | Internal Pressure (kPa) | SH (mm) | Ts/Tb (%) | Ts (mm) | Tb (mm) | Tbc (mm) |
|---|---|---|---|---|---|---|---|---|
| Comparative Example 14 | 195/65R15 | 0.31 | 220 | 126.8 | 67 | 10 | 15 | 10 |
| Comparative Example 15 | 195/65R15 | 0.31 | 220 | 126.8 | 33 | 5 | 15 | 10 |
| Comparative Example 16 | 165/65R19 | 0.24 | 220 | 107.3 | 71 | 10 | 14 | 8 |
| Test Tire 72 | 165/65R19 | 0.24 | 220 | 107.3 | 29 | 4 | 14 | 8 |
| Comparative Example 17 | 165/55R21 | 0.23 | 220 | 107.3 | 69 | 9 | 13 | 6 |
| Test Tire 73 | 165/55R21 | 0.23 | 220 | 107.3 | 27 | 3.5 | 13 | 6 |
| Comparative Example 18 | 155/55R21 | 0.22 | 220 | 85.3 | 71 | 10 | 14 | 4 |
| Test Tire 74 | 155/55R21 | 0.22 | 220 | 85.3 | 29 | 4 | 14 | 4 |
| Comparative Example 19 | 155/55R21 | 0.22 | 220 | 85.3 | 9 | 1.3 | 14 | 4 |

TABLE 10-continued

|  | Tire Size | Ratio SW/OD | Internal Pressure (kPa) | SH (mm) | Ts/Tb (%) | Ts (mm) | Tb (mm) | Tbc (mm) |
|---|---|---|---|---|---|---|---|---|
| Test Tire 75 | 155/55R21 | 0.22 | 220 | 85.3 | 29 | 4 | 14 | 3 |
| Test Tire 76 | 165/65R19 | 0.24 | 220 | 107.3 | 15 | 2.3 | 15 | 8 |
| Test Tire 77 | 165/65R19 | 0.24 | 220 | 40 | 5.2 | 13 | 8 | |
| Comparative Example 20 | 165/65R19 | 0.24 | 220 | 107.3 | 14 | 1.7 | 12 | 8 |
| Comparative Example 21 | 165/65R19 | 0.24 | 220 | 107.3 | 41 | 6.2 | 15 | 8 |
| Test Tire 78 | 155/55R21 | 0.22 | 220 | 85.3 | 15 | 2.3 | 15 | 4 |
| Test Tire 79 | 155/55R21 | 0.22 | 220 | 85.3 | 40 | 5.2 | 13 | 4 |
| Comparative Example 22 | 155/55R21 | 0.22 | 220 | 85.3 | 14 | 1.7 | 12 | 4 |
| Comparative Example 23 | 155/55R21 | 0.22 | 220 | 85.3 | 41 | 6.2 | 15 | 4 |
| Test Tire 80 | 155/55R21 | 0.22 | 220 | 85.3 | 15 | 1.5 | 10 | 4 |
| Test Tire 81 | 155/55R21 | 0.22 | 220 | 85.3 | 29 | 4 | 14 | 13 |
| Test Tire 82 | 155/55R21 | 0.22 | 220 | 85.3 | 17.5 | 1.4 | 8 | 4 |

TABLE 11

|  | Vertical Spring | Lateral Spring | Lateral Spring/ Vertical Spring | RR Value | CP | Weight | Ground-Contact Length L | Ground-Contact Width W | OD |
|---|---|---|---|---|---|---|---|---|---|
| Comparative Example 14 | 100 | 100 | 100 | 100 | 100 | 100 | 100 | 100 | 100 |
| Comparative Example 15 | 99 | 97 | 98 | 97 | 98 | 97 | 101 | 100 | 100 |
| Comparative Example 16 | 115 | 111 | 96 | 97 | 104 | 93 | 102 | 85 | 109.9 |
| Test Tire 72 | 97 | 107 | 110 | 96 | 102 | 90 | 103 | 85 | 109.9 |
| Comparative Example 17 | 130 | 116 | 89 | 85 | 104 | 86 | 103 | 80 | 112.7 |
| Test Tire 73 | 97 | 111 | 114 | 84 | 101 | 83 | 104 | 80 | 112.7 |
| Comparative Example 18 | 120 | 111 | 92 | 98 | 109 | 77 | 104 | 86 | 110.9 |
| Test Tire 74 | 97 | 104 | 106 | 96 | 105 | 75 | 105 | 86 | 110.9 |
| Comparative Example 19 | 96 | 97 | 101 | 80 | 95 | 72 | 106 | 86 | 110.9 |
| Test Tire 75 | 95 | 96 | 101 | 78 | 102 | 74 | 106 | 86 | 110.9 |
| Test Tire 76 | 97 | 102 | 105 | 94 | 100 | 88 | 103 | 85 | 109.9 |
| Test Tire 77 | 99 | 109 | 110 | 95 | 106 | 93 | 103 | 85 | 109.9 |
| Comparative Example 20 | 98 | 97 | 99 | 94 | 98 | 86 | 103 | 85 | 109.9 |
| Comparative Example 21 | 110 | 109 | 99 | 97 | 110 | 98 | 103 | 85 | 109.9 |
| Test Tire 78 | 98 | 100 | 102 | 95 | 103 | 73 | 105 | 86 | 110.9 |
| Test Tire 79 | 99 | 107 | 106 | 97 | 108 | 77 | 105 | 86 | 110.9 |
| Comparative Example 22 | 98 | 97 | 99 | 94 | 98 | 72 | 105 | 86 | 110.9 |
| Comparative Example 23 | 109 | 106 | 97 | 99 | 110 | 80 | 105 | 86 | 110.9 |
| Test Tire 80 | 97 | 97 | 100 | 81 | 102 | 70 | 106 | 86 | 110.9 |
| Test Tire 81 | 99 | 103 | 104 | 83 | 104 | 73 | 106 | 86 | 110.9 |
| Test Tire 82 | 95 | 95 | 100 | 80 | 101 | 69 | 106 | 86 | 110.9 |

As shown in Tables 10, 11 and FIGS. 23 (*a*), (*b*), each of the test tires satisfying the relational expression A or the relational expression B and, simultaneously, having the ratio Ts/Tb within the favorable range is lightweight and has less rolling resistance as well as smaller vertical spring coefficient, thus providing excellent comfortability.

Also, the test tires having a favorable gauge Ts have excellent cornering power.

Further, the test tires having favorable values of the diameter Tbc of the bead core also have excellent cornering power.

Next, in order to see the effect of the tire with high internal pressure, tests for evaluation of performance of test tires 83 to 88 and tires according to Comparative Examples 24 and 25 with high internal pressure shown below were conducted.

Figure 24A:
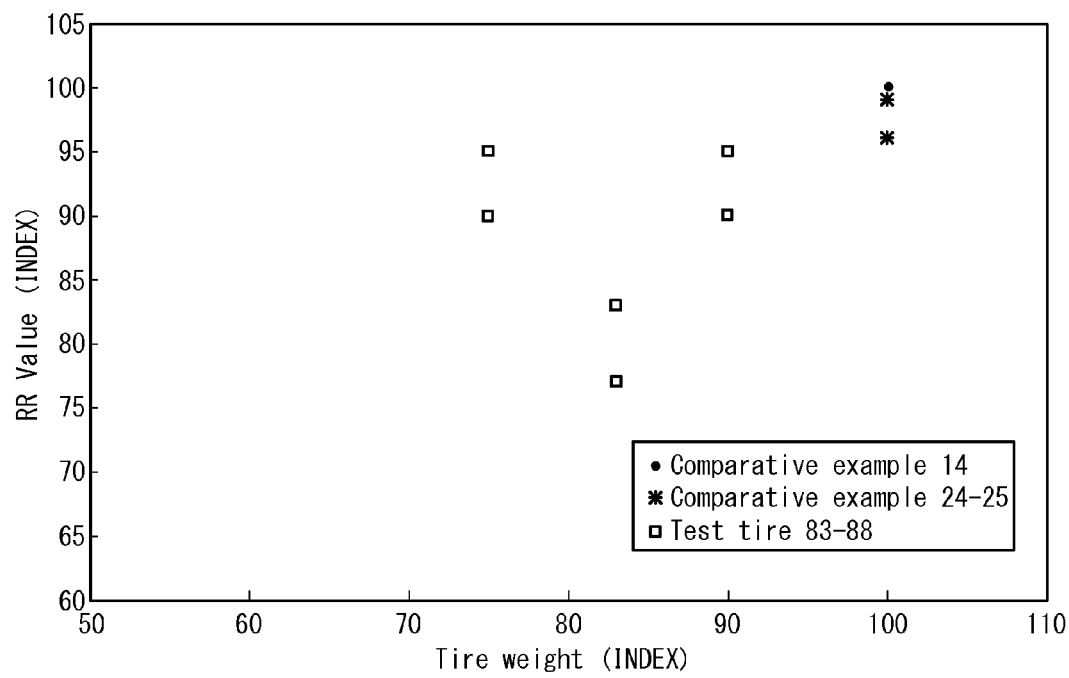
FIGS. 24(a), (b) are graphs illustrating results of an evaluation of a tire performance test.
Figure 24B:
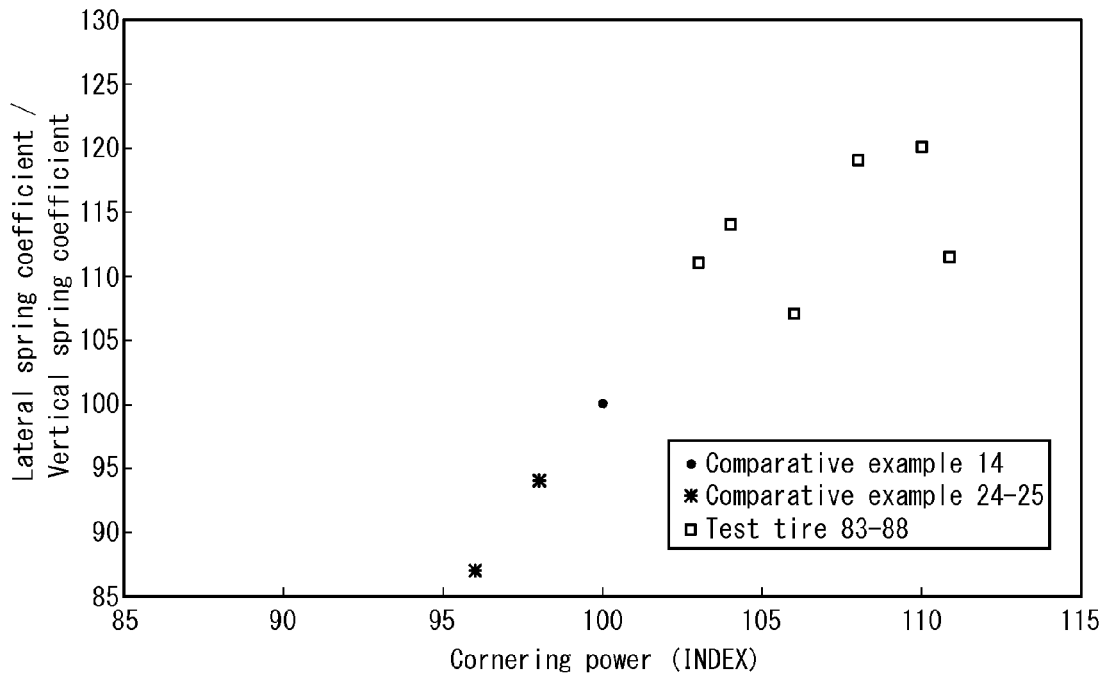

Specifications of each of the tires are shown in Table 12, and results of the evaluation are shown in Table 13 and FIGS. 24(*a*), (*b*).

TABLE 12

|  | Tire Size | Ratio SW/OD | Internal Pressure (kPa) | SH (mm) | Ts/Tb (%) | Ts (mm) | TB (mm) | TBC (mm) |
|---|---|---|---|---|---|---|---|---|
| Comparative Example 14 | 195/65R15 | 0.31 | 220 | 126.8 | 67 | 10 | 15 | 10 |
| Comparative Example 24 | 195/65R15 | 0.31 | 240 | 126.8 | 67 | 10 | 15 | 10 |
| Comparative Example 25 | 195/65R15 | 0.31 | 250 | 126.8 | 67 | 10 | 15 | 10 |
| Test Tire 83 | 165/65R19 | 0.24 | 240 | 107.3 | 29 | 4 | 14 | 8 |
| Test Tire 84 | 165/65R19 | 0.24 | 250 | 107.3 | 29 | 4 | 14 | 8 |
| Test Tire 85 | 165/55R21 | 0.23 | 240 | 107.3 | 27 | 3.5 | 13 | 6 |
| Test Tire 86 | 165/55R21 | 0.23 | 250 | 107.3 | 27 | 3.5 | 13 | 6 |
| Test Tire 87 | 155/55R21 | 0.22 | 240 | 85.3 | 29 | 4 | 14 | 4 |
| Test Tire 88 | 155/55R21 | 0.22 | 250 | 85.3 | 29 | 4 | 14 | 4 |

TABLE 13

|  | Vertical Spring | Lateral Spring | Lateral Spring/ Vertical Spring | RR Value | CP | Weight | Ground-Contact Length L | Ground-Contact Width W | OD |
|---|---|---|---|---|---|---|---|---|---|
| Comparative Example 14 | 100 | 100 | 100 | 100 | 100 | 100 | 100 | 100 | 100 |
| Comparative Example 24 | 110 | 106 | 94 | 99 | 98 | 100 | 96 | 100 | 100 |
| Comparative Example 25 | 115 | 110 | 87 | 96 | 96 | 100 | 93 | 100 | 100 |
| Test Tire 83 | 98 | 109 | 111 | 95 | 103 | 90 | 102 | 85 | 109.9 |
| Test Tire 84 | 99 | 118 | 119 | 90 | 108 | 90 | 100 | 85 | 109.9 |
| Test Tire 85 | 98 | 112 | 114 | 83 | 104 | 83 | 103 | 80 | 112.7 |
| Test Tire 86 | 99 | 119 | 120 | 77 | 110 | 83 | 101 | 80 | 112.7 |
| Test Tire 87 | 98 | 105 | 107 | 95 | 106 | 75 | 104 | 86 | 110.9 |
| Test Tire 88 | 99 | 111 | 112 | 90 | 111 | 75 | 100 | 86 | 110.9 |

From Table 13 and FIGS. 24(a), (b), it can be seen that using the tire with high internal pressure may reduce the tire rolling resistance value and improve the cornering power.

Example 3

Next, in order to see the effect of a tire according to Example 3, test tires 89 to 103 and tires according to Comparative Examples 26 to 34 were produced experimentally. Each of the tires includes the carcass, which is composed of a ply of codes radially arranged and toroidally provided between a pair of bead portions, and a pair of sidewall portions connected to the bead portions.

In order to evaluate the performance of these tires, in a manner similar to Example 1, tests were conducted for evaluation of the spring coefficients, the rolling resistance value (RR value), the cornering power, and the tire weight.

Note that, for evaluation, the spring coefficients are shown as indices relative to those of the tire according to Comparative Example 26 set to 100. The greater the value, the higher the spring constant. Also, the rolling resistance value (RR value), for evaluation thereof, is shown as an index relative to that of the tire according to Comparative Example 26 set to 100. The smaller the index, the smaller the rolling resistance. Further, the cornering power, for evaluation thereof, is shown as an index relative to that of the tire according to Comparative Example 26 set to 100. The greater the index, the preferably higher the cornering power. Also, the tire weight, for evaluation thereof, is shown as an index relative to that of the tire according to Comparative Example 26 set to 100. The smaller the value, the lighter the weight.

Figure 25A:
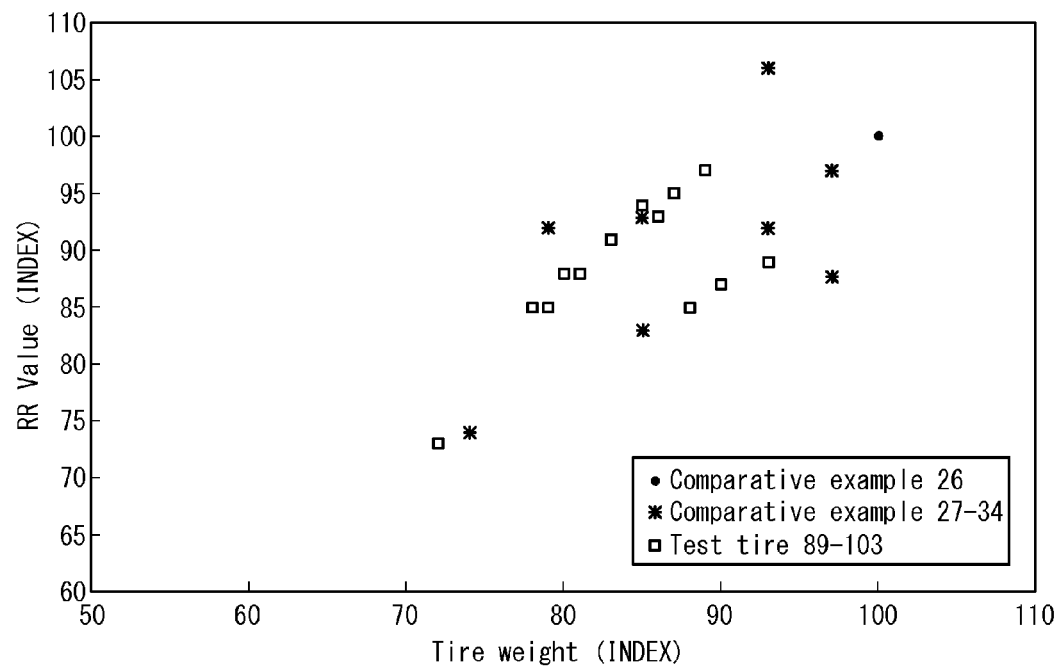
FIGS. 25(a), (b) are graphs illustrating results of an evaluation of a tire performance test.
Figure 25B:
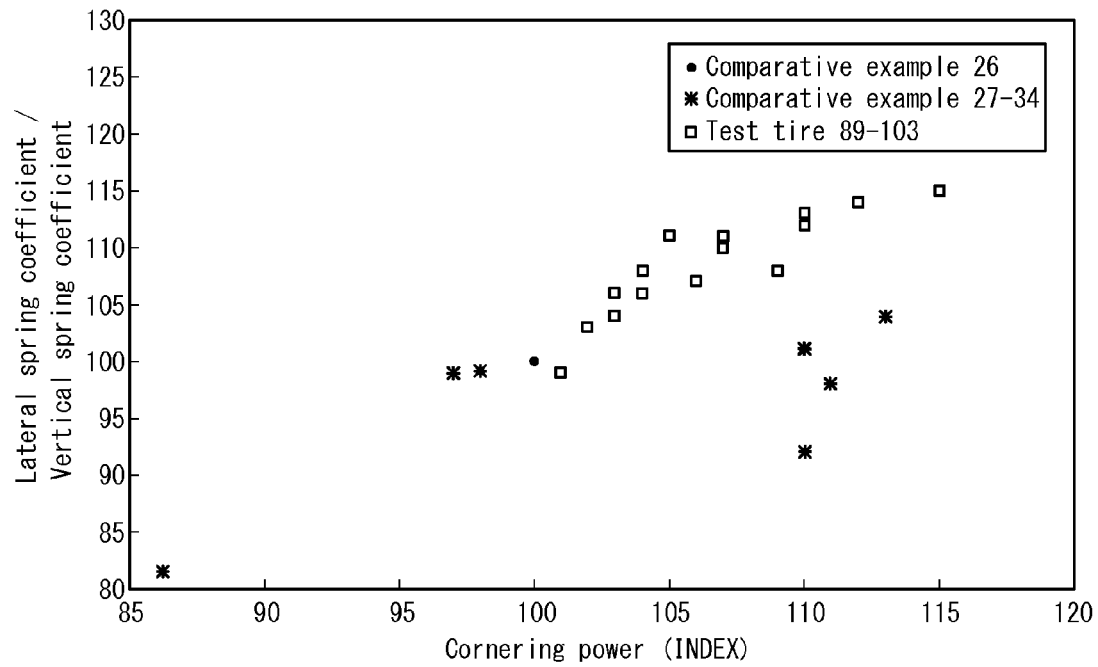

Specifications of each of the tires are shown in Table 14, and results of the evaluation are shown in Table 15 and FIGS. 25(a), (b).

TABLE 14

|  | Tire Size | SW/OD | Internal Pressure (kPa) | Ts (mm) | Ta (mm) | Tc (mm) | Ts/Tc | Ta/Tc |
|---|---|---|---|---|---|---|---|---|
| Comparative Example 26 | 195/65R15 | 0.31 | 220 | 10 | 6 | 0.66 | 15.2 | 9.1 |
| Comparative Example 27 | 195/65R15 | 0.31 | 220 | 5 | 3 | 0.66 | 7.6 | 4.5 |
| Comparative Example 28 | 165/65R19 | 0.24 | 220 | 10 | 5 | 0.5 | 20 | 10 |
| Test Tire 89 | 165/65R19 | 0.24 | 220 | 4 | 2.5 | 0.5 | 8 | 5 |
| Comparative Example 29 | 165/55R21 | 0.23 | 220 | 9 | 5.5 | 0.5 | 18 | 11 |

TABLE 14-continued

|  | Tire Size | SW/OD | Internal Pressure (kPa) | Ts (mm) | Ta (mm) | Tc (mm) | Ts/Tc | Ta/Tc |
|---|---|---|---|---|---|---|---|---|
| Test Tire 90 | 165/55R21 | 0.23 | 220 | 3.5 | 2.8 | 0.5 | 7 | 5.6 |
| Comparative Example 30 | 155/55R21 | 0.22 | 220 | 10 | 6 | 0.55 | 18.2 | 10.9 |
| Test Tire 91 | 155/55R21 | 0.22 | 220 | 4 | 2 | 0.55 | 7.3 | 3.6 |
| Comparative Example 31 | 155/55R21 | 0.22 | 220 | 10 | 6 | 0.8 | 12.5 | 7.5 |
| Test Tire 92 | 165/65R19 | 0.24 | 220 | 2.5 | 2.5 | 0.5 | 5 | 5 |
| Test Tire 93 | 165/65R19 | 0.24 | 220 | 5 | 2.5 | 0.5 | 10 | 5 |
| Comparative Example 32 | 165/65R19 | 0.24 | 220 | 2.3 | 2.5 | 0.5 | 4.5 | 5 |
| Comparative Example 33 | 165/65R19 | 0.24 | 220 | 6.3 | 2.5 | 0.5 | 12.5 | 5 |
| Test Tire 94 | 155/55R21 | 0.22 | 220 | 2.8 | 2 | 0.55 | 5 | 3.6 |
| Test Tire 95 | 155/55R21 | 0.22 | 220 | 5.5 | 2 | 0.55 | 10 | 3.6 |
| Comparative Example 34 | 155/55R21 | 0.22 | 220 | 2.5 | 2 | 0.55 | 4.5 | 3.6 |
| Test Tire 96 | 155/55R21 | 0.22 | 220 | 4 | 1.7 | 0.55 | 7.3 | 3 |
| Test Tire 97 | 155/55R21 | 0.22 | 220 | 4 | 3.3 | 0.55 | 7.3 | 6 |
| Test Tire 98 | 155/55R21 | 0.22 | 220 | 4 | 1.4 | 0.55 | 7.3 | 2.5 |
| Test Tire 99 | 155/55R21 | 0.22 | 220 | 4 | 3.9 | 0.55 | 7.3 | 7 |
| Test Tire 100 | 155/55R21 | 0.22 | 220 | 5.1 | 2.5 | 0.7 | 7.3 | 3.6 |
| Test Tire 101 | 155/55R21 | 0.22 | 220 | 2.9 | 1.4 | 0.4 | 7.3 | 3.6 |
| Test Tire 102 | 155/55R21 | 0.22 | 220 | 5.8 | 2.9 | 0.8 | 7.3 | 3.6 |
| Test Tire 103 | 155/55R21 | 0.22 | 220 | 2.6 | 1.3 | 0.35 | 7.3 | 3.6 |

TABLE 15

|  | Vertical Spring | Lateral Spring | Lateral Spring/ Vertical Spring | RR Value | CP | Weight | Ground-Contact Length L | Ground-Contact Width W | OD |
|---|---|---|---|---|---|---|---|---|---|
| Comparative Example 26 | 100 | 100 | 100 | 100 | 100 | 100 | 100 | 100 | 100 |
| Comparative Example 27 | 104 | 84 | 81 | 97 | 86 | 97 | 101 | 100 | 100 |
| Comparative Example 28 | 110 | 112 | 101 | 92 | 110 | 93 | 105 | 85 | 109.9 |
| Test Tire 89 | 97 | 106 | 107 | 87 | 106 | 90 | 106 | 85 | 109.9 |
| Comparative Example 29 | 120 | 126 | 104 | 74 | 113 | 74 | 103 | 80 | 112.7 |
| Test Tire 90 | 99 | 116 | 111 | 73 | 105 | 72 | 103 | 80 | 112.7 |
| Comparative Example 30 | 113 | 114 | 101 | 93 | 110 | 86 | 103 | 86 | 110.9 |
| Test Tire 91 | 98 | 110 | 110 | 91 | 107 | 83 | 103 | 86 | 110.9 |
| Comparative Example 31 | 130 | 120 | 92 | 106 | 110 | 93 | 101 | 86 | 110.9 |
| Test Tire 92 | 95 | 101 | 106 | 85 | 103 | 88 | 106 | 85 | 109.9 |
| Test Tire 93 | 99 | 107 | 108 | 89 | 109 | 93 | 106 | 85 | 109.9 |
| Comparative Example 32 | 95 | 94 | 99 | 83 | 97 | 85 | 106 | 85 | 109.9 |
| Comparative Example 33 | 110 | 108 | 98 | 88 | 111 | 97 | 106 | 85 | 109.9 |
| Test Tire 94 | 97 | 103 | 106 | 88 | 104 | 80 | 103 | 86 | 110.9 |
| Test Tire 95 | 99 | 112 | 113 | 93 | 110 | 86 | 103 | 86 | 110.9 |
| Comparative Example 34 | 96 | 95 | 99 | 92 | 98 | 79 | 103 | 86 | 110.9 |
| Test Tire 96 | 98 | 102 | 104 | 88 | 103 | 80 | 103 | 86 | 110.9 |
| Test Tire 97 | 98 | 109 | 111 | 94 | 107 | 85 | 103 | 86 | 110.9 |
| Test Tire 98 | 97 | 96 | 99 | 85 | 101 | 78 | 103 | 86 | 110.9 |
| Test Tire 99 | 99 | 111 | 112 | 97 | 110 | 89 | 103 | 86 | 110.9 |
| Test Tire 100 | 99 | 113 | 114 | 93 | 112 | 85 | 103 | 86 | 110.9 |
| Test Tire 101 | 96 | 104 | 108 | 88 | 104 | 81 | 103 | 86 | 110.9 |
| Test Tire 102 | 99 | 114 | 115 | 95 | 115 | 87 | 103 | 86 | 110.9 |
| Test Tire 103 | 95 | 98 | 103 | 85 | 102 | 79 | 103 | 86 | 110.9 |

As shown in Tables 14, 15 and FIGS. 25(a), (b), each of the test tires satisfying the relational expression A or the relational expression B and, simultaneously, having the ratio Ts/Tc within a favorable range is lightweight and has less rolling resistance as well as small vertical spring coefficient, thus providing excellent comfortability.

Also, the test tires having Ta/Tc in a favorable range have smaller vertical spring coefficients while maintaining approximately the same cornering power.

Further, the test tires having favorable values of the code diameter Tc have further smaller vertical spring coefficients and improved cornering power.

Next, in order to see the effect of the tire having high internal pressure, tests for evaluation of performance of test tires 104 to 109 and tires according to Comparative Examples 35 to 37 with high internal pressure shown below were conducted.

Figure 26A:
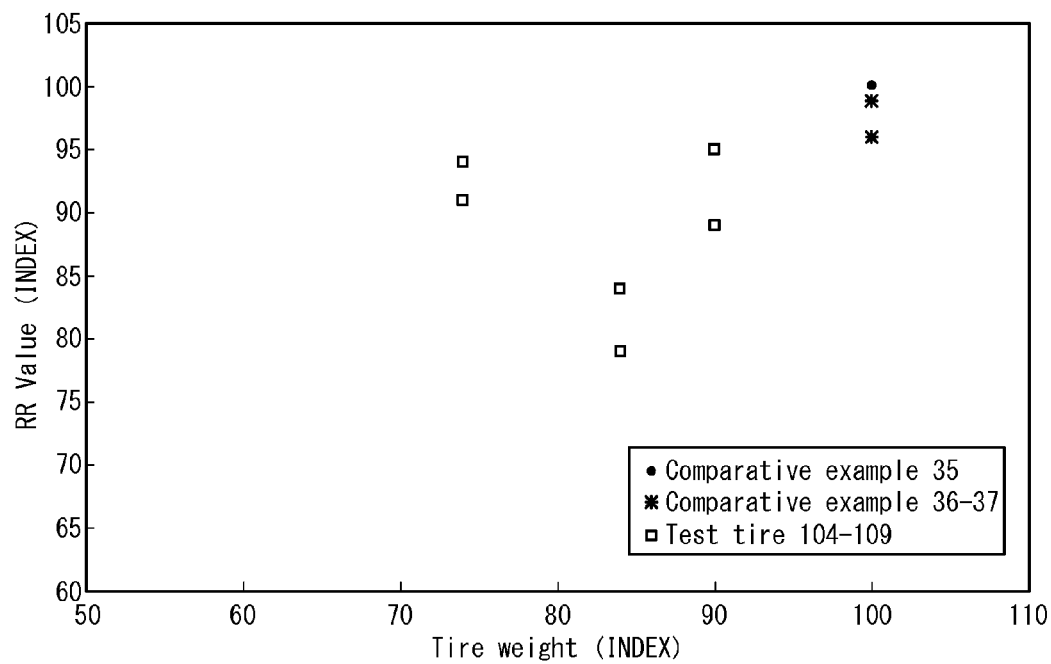
FIGS. 26(a), (b) are graphs illustrating results of an evaluation of a tire performance test.

Specifications of each of the tires are shown in Table 16, and results of the evaluation are shown in Table 17 and FIGS. 26(a), (b).

TABLE 16

|  | Tire Size | Ratio SW/OD | Internal Pressure (kPa) | Ts (mm) | Ta (mm) | Tc (mm) | Ts/Tc | Ta/Tc |
|---|---|---|---|---|---|---|---|---|
| Comparative Example 35 | 195/65R15 | 0.31 | 220 | 10 | 6 | 0.66 | 15.2 | 9.1 |
| Comparative Example 36 | 195/65R15 | 0.31 | 240 | 10 | 6 | 0.66 | 15.2 | 9.1 |
| Comparative Example 37 | 195/65R15 | 0.31 | 250 | 10 | 6 | 0.66 | 15.2 | 9.1 |
| Test Tire 104 | 165/65R19 | 0.24 | 240 | 4 | 2.5 | 0.5 | 8 | 5 |
| Test Tire 105 | 165/65R19 | 0.24 | 250 | 4 | 2.5 | 0.5 | 8 | 5 |
| Test Tire 106 | 165/55R21 | 0.23 | 240 | 3.5 | 2.8 | 0.5 | 7 | 5.6 |
| Test Tire 107 | 165/55R21 | 0.23 | 250 | 3.5 | 2.8 | 0.5 | 7 | 5.6 |
| Test Tire 108 | 155/55R21 | 0.22 | 240 | 4 | 2 | 0.55 | 7.3 | 3.6 |
| Test Tire 109 | 155/55R21 | 0.22 | 250 | 4 | 2 | 0.55 | 7.3 | 3.6 |

TABLE 17

|  | Vertical Spring | Lateral Spring | Lateral Spring/ Vertical Spring | RR Value | CP | Weight | Ground-Contact Length L | Ground-Contact Width W | OD |
|---|---|---|---|---|---|---|---|---|---|
| Comparative Example 35 | 100 | 100 | 100 | 100 | 100 | 100 | 100 | 100 | 100 |
| Comparative Example 36 | 110 | 106 | 94 | 99 | 98 | 100 | 97 | 100 | 100 |
| Comparative Example 37 | 115 | 110 | 87 | 96 | 96 | 100 | 93 | 100 | 100 |
| Test Tire 104 | 98 | 109 | 111 | 95 | 103 | 90 | 102 | 85 | 109.9 |
| Test Tire 105 | 99 | 119 | 120 | 89 | 109 | 90 | 100 | 85 | 109.9 |
| Test Tire 106 | 98 | 111 | 113 | 84 | 103 | 84 | 103 | 80 | 112.7 |
| Test Tire 107 | 99 | 117 | 118 | 79 | 108 | 84 | 101 | 80 | 112.7 |
| Test Tire 108 | 98 | 106 | 108 | 94 | 107 | 74 | 104 | 86 | 110.9 |
| Test Tire 109 | 99 | 110 | 111 | 91 | 110 | 74 | 100 | 86 | 110.9 |

Figure 26B:
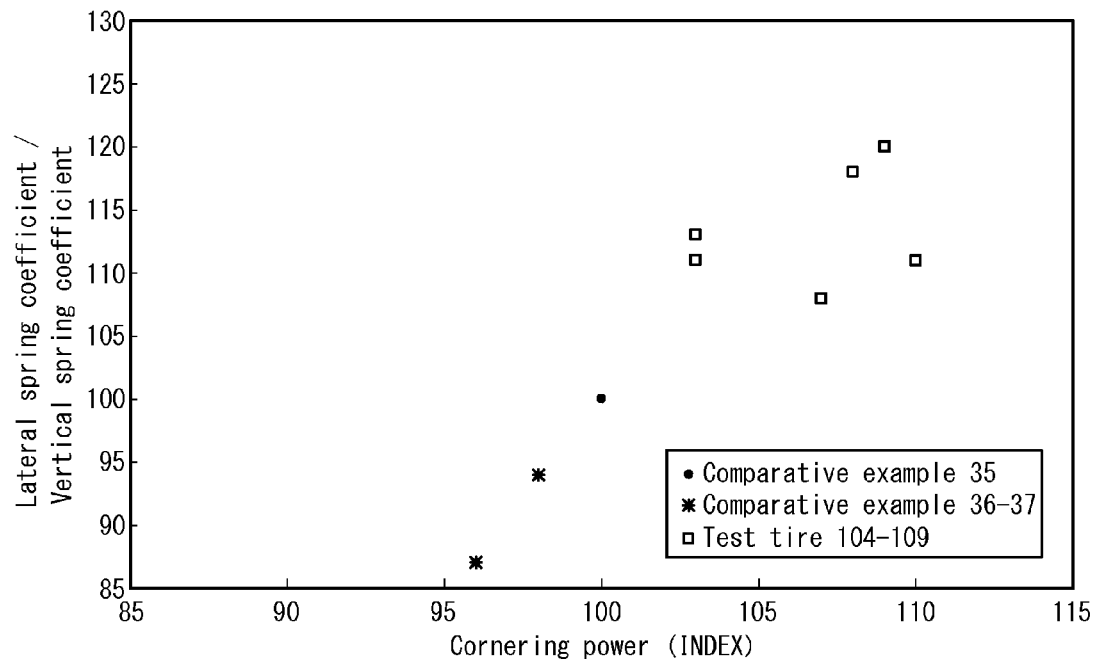

From Table 17 and FIGS. 26 (a), (b), it can be seen that, when the tire having high internal pressure is used, the tire rolling resistance value is further reduced and cornering power is further improved.

REFERENCE SIGNS LIST 1 bead portion
1a bead core
2 carcass
2a carcass main body
2b carcass folding portion
3 belt
4 bead filler
5 side wall portion
6 tire outer surface

The invention claimed is:
1. A tire-rim assembly formed by assembling a pair of bead cores of a passenger vehicle pneumatic radial tire having a carcass, which includes a ply of cords radially arranged and toroidally provided between the pair of bead cores, a belt and a bead filler disposed outside the bead cores in a tire radial direction, wherein:
the radial tire comprises an inner liner on a tire inner surface;
the radial tire is a tubeless tire;
the tire-rim assembly is applied with internal pressure of at least 250 kPa and less than 350 kPa and is filled only with gas,
a tire cross-sectional width SW is greater than or equal to 145 (mm) and less than 165 (mm),
a ratio of the tire cross-sectional width SW to a tire outer diameter OD, SW/OD, is no more than 0.26,
a ratio of the tire cross-sectional width SW to a rim outer diameter D, SW/D, is greater than 0.3 and less than 0.36,
an aspect ratio of the passenger vehicle pneumatic radial tire is greater than or equal to 50 and less than or equal to 70,
a bead filler tire-width-direction cross-sectional area S1 is one to four times a size of a bead core tire-width-direction cross-sectional area S2,
the bead filler is a high-rigidity member having 100% modulus at room temperature at 24 to 31 MPa, the belt comprises a belt cord with Young's modulus of 45,000 MPa or higher, the rim outer diameter D is in a range of 18 to 19 inches, and the tire outer diameter OD is in a range of 653.1 mm to 671.1 mm.

2. The tire-rim assembly according to claim 1, wherein, when BFW represents a width of the bead filler in a tire width direction in a tire radial direction center position of the bead filler and BDW represents a maximum width of the bead core in the tire width direction, the following relational expression:

$$0.1 \leq BFW/BDW \leq 0.5$$

is satisfied.

3. The tire-rim assembly according to claim 1, wherein, when BFH represents a height of the bead filler in the tire radial direction and SH represents a tire sectional height, the following relational expression:

$$0.1 \leq BFH/SH \leq 0.25$$

is satisfied.

4. The tire-rim assembly according to claim 1, wherein BFH, a height of the bead filler in the tire radial direction, is no more than 45 mm.

5. The tire-rim assembly according to claim 1, wherein the aspect ratio of the passenger vehicle pneumatic radial tire is greater than or equal to 50 and less than 70.

6. A tire-rim assembly formed by assembling a pair of bead cores of a passenger vehicle pneumatic radial tire having a carcass, which includes a ply of cords radially arranged and toroidally provided between the pair of bead cores, a belt and a bead filler disposed outside the bead cores in a tire radial direction, wherein:

the radial tire comprises an inner liner on a tire inner surface;

the radial tire is a tubeless tire;

the tire-rim assembly is applied with internal pressure of at least 250 kPa and less than 350 kPa and is filled only with gas, a tire cross-sectional width SW is greater than or equal to 145 (mm), the tire cross-sectional width SW and a tire outer diameter OD satisfy a relational expression:

$$OD \geq -0.0187 \times SW^2 + 9.15 \times SW - 380,$$

a ratio of the tire cross-sectional width SW to a rim outer diameter D, SW/D, is greater than 0.3 and less than or equal to 0.40, an aspect ratio of the passenger vehicle pneumatic radial tire is greater than or equal to 50 and less than or equal to 70, a bead filler tire-width-direction cross-sectional area S1 is one to four times a size of a bead core tire-width-direction cross-sectional area S2, the rim outer diameter D is in a range of 18 to 22 inches, and the tire outer diameter OD is in a range of 638.7 mm to 751.3 mm.

7. The tire-rim assembly according to claim 6, wherein, when BFW represents a width of the bead filler in a tire width direction in a tire radial direction center position of the bead filler and BDW represents a maximum width of the bead core in the tire width direction, the following relational expression:

$$0.1 \leq BFW/BDW \leq 0.5$$

is satisfied.

8. The tire-rim assembly according to claim 6, wherein, when BFH represents a height of the bead filler in the tire radial direction and SH represents a tire sectional height, the following relational expression:

$$0.1 \leq BFH/SH \leq 0.25$$

is satisfied.

9. The tire-rim assembly according to claim 6, wherein BFH, a height of the bead filler in the tire radial direction, is no more than 45 mm.

10. The tire-rim assembly according to claim 6, wherein the aspect ratio of the passenger vehicle pneumatic radial tire is greater than or equal to 50 and less than 70.

11. A tire-rim assembly formed by assembling a pair of bead cores of a passenger vehicle pneumatic radial tire having a carcass, which includes a ply of cords radially arranged and toroidally provided between the pair of bead cores, a belt and a bead filler disposed outside the bead cores in a tire radial direction, wherein:

the radial tire comprises an inner liner on a tire inner surface;

the radial tire is a tubeless tire;

the tire-rim assembly is applied with internal pressure of at least 250 kPa and less than 350 kPa and is filled only with gas, a tire cross-sectional width SW is greater than or equal to 145 (mm), the tire cross-sectional width SW and a tire outer diameter OD satisfy a relational expression:

$$OD \geq 22.135 \times SW + 282.3,$$

a ratio of the tire cross-sectional width SW to a rim outer diameter D, SW/D, is greater than 0.3 and less than or equal to 0.40, an aspect ratio of the passenger vehicle pneumatic radial tire is greater than or equal to 50 and less than or equal to 70, a bead filler tire-width-direction cross-sectional area S1 is one to four times a size of a bead core tire-width-direction cross-sectional area S2, the bead filler is a high-rigidity member having 100% modulus at room temperature at 24 to 31 MPa, the belt comprises a belt cord with Young's modulus of 45,000 MPa or higher, the rim outer diameter D is in a range of 18 to 22 inches, and the tire outer diameter OD is in a range of 638.7 mm to 751.3 mm.

12. The tire-rim assembly according to claim 11, wherein, when BFW represents a width of the bead filler in a tire width direction in a tire radial direction center position of the bead filler and BDW represents a maximum width of the bead core in the tire width direction, the following relational expression:

$$0.1 \leq BFW/BDW \leq 0.5$$

is satisfied.

13. The tire-rim assembly according to claim 11, wherein, when BFH represents a height of the bead filler in the tire radial direction and SH represents a tire sectional height, the following relational expression:

$$0.1 \leq BFH/SH \leq 0.25$$

is satisfied.

14. The tire-rim assembly according to claim 11, wherein BFH, a height of the bead filler in the tire radial direction, is no more than 45 mm.

15. The tire-rim assembly according to claim 11, wherein the aspect ratio of the passenger vehicle pneumatic radial tire is greater than or equal to 50 and less than 70.

* * * * *